(12) United States Patent
Zhou et al.

(10) Patent No.: US 9,532,334 B1
(45) Date of Patent: Dec. 27, 2016

(54) SHARED ALLOCATION OF RESOURCE BLOCKS BY HASHING TO SUB-SEGMENTS

(71) Applicant: Sprint Spectrum L.P., Overland Park, KS (US)

(72) Inventors: Yu Zhou, Herndon, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 137 days.

(21) Appl. No.: 14/612,474

(22) Filed: Feb. 3, 2015

(51) Int. Cl.
*H04W 4/00* (2009.01)
*H04W 72/04* (2009.01)

(52) U.S. Cl.
CPC .................................. *H04W 72/04* (2013.01)

(58) Field of Classification Search
None
See application file for complete search history.

(56) References Cited

U.S. PATENT DOCUMENTS

| | | | | |
|---|---|---|---|---|
| 2014/0185495 A1* | 7/2014 | Kuchibhotla | ....... | H04W 76/023 370/281 |
| 2014/0185534 A1* | 7/2014 | Vos | ...................... | H04W 72/042 370/329 |
| 2015/0237646 A1* | 8/2015 | Huang | ............... | H04W 72/1226 370/280 |

FOREIGN PATENT DOCUMENTS

CN WO 2014/107883 A1 * 7/2014 ............ H04W 16/12

OTHER PUBLICATIONS

"On resource block sharing in 3GPP-LTE system," Min Lee and Seong Kuen Oh, 2011 17th Asia-Pacific Conference on Communications (APCC), Oct. 2-5, 2011, pp. 38-42.

* cited by examiner

*Primary Examiner* — Otis L Thompson, Jr.

(57) ABSTRACT

Disclosed is a system and method for multiple wireless communication devices (WCDs) to share a resource block in an orthogonal frequency division multiplexing communication system by assigning each WCD a different one of multiple different sub-segments of the resource block. A base station can allocate the shared resource block on to the WCDs, and use hash function applied to each WCD to assign a different one of the sub-segments to each WCD. Each of the WCDs can apply the same hash function to determine the same sub-segment assignment made by the base station. For downlink communications, the base station can transmit data to each WCD in the assigned sub-segment, and each WCD can recover its data from its assigned sub-segment. For uplink communications, each WCD can transmit its data to the base station in its assigned sub-segment, and the base station can recover each WCD's data from the assigned sub-segment.

20 Claims, 11 Drawing Sheets

SHARED ALLOCATION OF RESOURCE BLOCKS BY HASHING TO SUB-SEGMENTS

BACKGROUND

Unless otherwise indicated herein, the materials described in this section are not prior art to the claims and are not admitted to be prior art by inclusion in this section.

In a wireless communication system, a base station may transmit downlink data to one or more wireless communication devices (WCDs) that are operating in a wireless coverage area provided by the base station. The wireless coverage area could be, for example, a cell or a sector. The base station may also receive uplink data from one or more WCDs operating in the wireless coverage area.

Some of the downlink data transmitted by the base station may be transmitted in a downlink channel that can be shared among multiple WCDs. For example, the Long Term Evolution (LTE) of the Universal Mobile Telecommunications System (UMTS) defines a Physical Downlink Shared Channel (PDSCH) as the primary downlink channel for transmitting user data to WCDs. In addition, LTE defines downlink control channels that carry various types of control signaling. The downlink control channels include a Physical Control Format Indicator Channel (PCFICH), a Physical Downlink Control Channel (PDCCH), and a Physical Hybrid ARQ Indicator Channel (PHICH). LTE also defines a Physical Uplink Shared Channel (PUSCH) as the primary uplink channel for transmitting data from WCDs to a base station, and a Physical Uplink Control Channel (PUCCH) for transmitting control signaling from WCDs to the base station.

In the LTE approach, uplink and downlink resources are mapped in the time domain and in the frequency domain. In the time domain, LTE defines 10 millisecond (ms) frames, 1 ms sub-frames and 0.5 ms slots. Thus, each frame has 10 sub-frames, and each sub-frame has 2 slots. Each slot is further sub-divided into a fixed number of symbol transmission times. The fixed number is typically either 7 (although some implementations can use 6). In the frequency domain, resources are divided into groups of 12 sub-carriers. Each sub-carrier is 15 kHz wide, so each group of 12 sub-carriers occupies a 180 kHz bandwidth. During each symbol transmission time, the sub-carriers are modulated together, using orthogonal frequency division multiplexing (OFDM), to form one OFDM symbol.

LTE further defines a particular grouping of time-domain and frequency-domain resources as a resource block. In the time domain, each resource block has a duration corresponding to one slot (0.5 ms). In the frequency domain, each resource block consists of a group of 12 sub-carriers that are used together to form OFDM symbols. Typically, the 0.5 ms duration of a resource block accommodates 7 OFDM symbols. Depending on the bandwidth of the system, multiple resource blocks can be transmitted in each 0.5 ms slot. For example, a system with a 5 MHz bandwidth may be able to transmit 25 resource blocks in each 0.5 ms slot.

The smallest unit of resources is the resource element. Each resource element corresponds to one sub-carrier and one OFDM symbol. Thus, a resource block that consists of 12 sub-carriers and 7 OFDM symbols has 84 resource elements. Within a resource block, different resource elements can have different functions. In particular, a certain number of the resource elements (e.g., 8 resource elements) may be reserved for reference signals used for channel estimation. In addition, a certain number of the resource elements (e.g., the resource elements in the first one to four OFDM symbols) may be reserved for control signals in the PCFICH, PDCCH, PHICH, and PUCCH channels. The remaining resource elements in a resource block can be used for user data in the PDSCH channel on a downlink or the PUSCH channel on an uplink.

The PDSCH and PUSCH channels can be shared among WCDs by allocating one or more downlink and/or uplink resource blocks to each WCD. Conventionally, the user data in a resource block that is allocated to a particular WCD is for only that particular WCD. Thus, while the data channels can be shared by multiple WCDs, the user data in a resource block might be for only one WCD.

OVERVIEW

Under conventional operation in a system such as the one described above, the smallest air-interface unit that a base station can assign for downlink transmission of data to a given WCD is a PDSCH segment corresponding to one 12-subcarrier-wide downlink resource block. Similarly, the smallest unit that can be conventionally assigned for uplink transmission of data from a given WCD is a PUSCH segment corresponding to one 12-subcarrier-wide uplink resource block. Each of the 84 resource elements of an allocated resource block can therefore be considered as being allocated to the given WCD as well. The number of bits of data that can be carried in each resource element depends on the modulation scheme used. For example, if Quadrature Phase Shift Keying (QPSK) is used, then each sub-carrier symbol represents two bits of data. If Quadrature Amplitude Modulation (QAM) is used for the sub-carrier symbols, then each sub-carrier symbol represents a greater number of bits: four bits per symbol for 16-QAM and six bits per symbol for 64-QAM. For a fixed OFDM symbol rate, the bit rate of data transmission can therefore vary depending on (among other possible factors) the modulation scheme used.

Under LTE, the modulation scheme used during any given symbol transmission time, and therefore the data rate, can be different for the different sub-carriers—and correspondingly for different resource elements transmitted—during the given symbol transmission time. Typically, the modulation scheme will be the same for all sub-carriers assigned to a given user during a symbol transmission time. Selection of the modulation scheme used for a given sub-carrier during a given symbol transmission time can depend on radio frequency (RF) operation conditions (e.g., signal-to-noise) during the given symbol transmission time. Similarly, the modulation scheme can be adapted according to RF conditions at different symbol transmissions times, so that a different modulation scheme can be used for the same sub-carrier at different times.

The conventional approach of allocating a resource block to only a single WCD can in some instances lead to inefficiencies. For example, if a resource block that is able to provide data at a relatively high data rate, such as 1 Mbits/second is allocated to a user for data that has a much lower data rate (e.g., voice data), then the user may have in effect been allocated more bandwidth than necessary. It would therefore be desirable to provide more efficient use of resources. Accordingly, methods and systems disclosed herein enable a resource block to be allocated on a shared basis to more than one WCD. More particularly, multiple WCDs may be allocated different sub-segments of a common resource block by applying a hash function to a digital identifier of each given WCD in order to determine which of multiple sub-segments to assign to the given WCD.

Hence, in one respect, various embodiments of the present invention provide a method comprising: allocating a resource block to a plurality of wireless communication devices (WCDs), wherein the resource block comprises multiple orthogonal frequency division multiplexing (OFDM) resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol; applying a hash operation to a respective digital identifier of each respective WCD in the plurality of WCDs to designate for each respective WCD a respective sub-segment of the allocated resource block, wherein each respective sub-segment comprises a different grouping of one or more OFDM resource elements within the allocated resource block; assigning to each respective WCD in the plurality of WCDs the respective sub-segment designated by the hash operation applied to the respective digital identifier of the respective WCD; and simultaneously engaging, by a transceiver, in respective air interface communications with the plurality of WCDs, wherein one or more data symbols in each respective air interface communication with a respective WCD in the plurality are carried in the respective sub-segment assigned within the allocated resource block to the respective WCD.

In another respect, various embodiments of the present invention provide a method comprising: a wireless communication device (WCD) receiving an indication of a resource block being allocated to the WCD, wherein the resource block comprises multiple orthogonal frequency division multiplexing (OFDM) resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol; the WCD making a determination that the allocated resource block is allocated for concurrent sharing with at least one other WCD; in response to making the determination, the WCD applying a hash operation to a digital identifier of the WCD to designate a particular sub-segment of the allocated resource block, wherein the respective sub-segment comprises a particular grouping of one or more OFDM resource elements within the allocated resource block; and the WCD engaging, by a transceiver of the WCD, in an air interface communication with a base station, wherein one or more data symbols in the air interface communication are carried in the particular sub-segment within the allocated resource block.

Further, in still another respect, various embodiments of the present invention provide a base station comprising: a transceiver for engaging wireless communications with wireless communication devices (WCDs) operating in a wireless coverage area of the base station; one or more processors; memory accessible to the one or more processors; and machine-readable instructions stored in the memory, that upon execution by the one or more processors cause the base station to carry out operations including: allocating a resource block to a plurality of WCDs, wherein the resource block comprises multiple orthogonal frequency division multiplexing (OFDM) resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol, applying a hash operation to a respective digital identifier of each respective WCD in the plurality of WCDs to designate for each respective WCD a respective sub-segment of the allocated resource block, wherein each respective sub-segment comprises a different grouping of one or more OFDM resource elements within the allocated resource block, assigning to each respective WCD in the plurality of WCDs the respective sub-segment designated by the hash operation applied to the respective digital identifier of the respective WCD, and simultaneously engaging, by the transceiver, in respective air interface communications with the plurality of WCDs, wherein one or more data symbols in each respective air interface communication with a respective WCD in the plurality are carried in the respective sub-segment assigned within the allocated resource block to the respective WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

1. EXAMPLE COMMUNICATION SYSTEM

Figure 1:
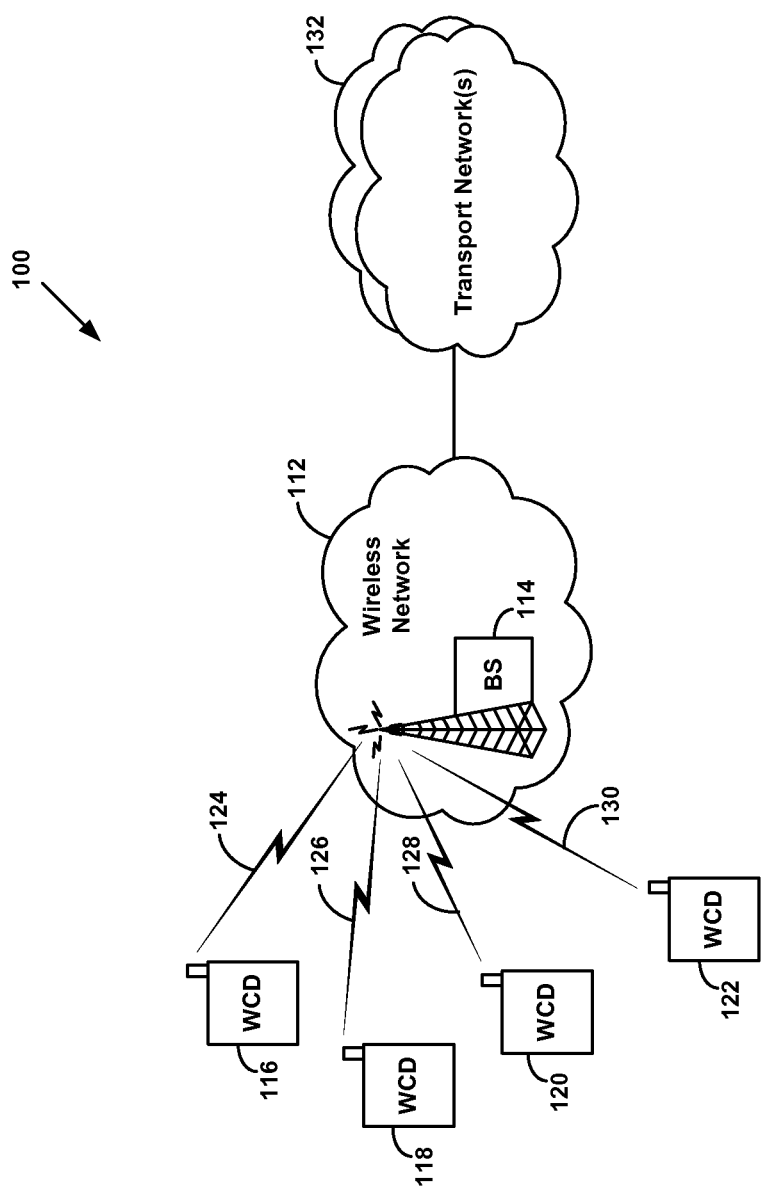
FIG. 1 is a simplified block diagram of a communication system, in accordance with an example embodiment.

FIG. 1 is a block diagram of a communication system 100 in which example embodiments may be employed. Communication system 100 includes a wireless network 112 that includes one or more entities that can communicate over an air interface, as exemplified by base station (BS) 114. Wireless network 112 could also include one or more control entities, such as a base station controller (BSC) or radio network controller (RNC). Wireless network 112 could be, for example, a radio access network (RAN). BS 114 could be, for example, a base transceiver station, a wireless access point, an access node, a Node-B, or an eNodeB. Although FIG. 1 shows only one base station in wireless network 112, it is to be understood that wireless network 112 could include any number of base stations.

BS 114 radiates to define one or more wireless coverage areas within which BS 114 can wirelessly communicate with WCDs. The wireless coverage area defined by BS 114 could be a cell that generally surrounds BS 114. Alternatively, BS 114 may define multiple wireless coverage areas, such as sectors. Each sector may be defined by multiple antennas in BS 114 so as to generally correspond to a range of azimuthal angles (e.g., 120°) about BS 114.

For purposes of illustration, BS 114 is shown as being in wireless communication with WCDs 116, 118, 120, and 122 via respective air interfaces 124, 126, 128, and 130. By way of example, WCDs 116-122 could be wireless telephones, wireless handheld or laptop computers, or other types of wireless communication devices. Although FIG. 1 shows BS 114 in wireless communication with four WCDs, it is to be understood that BS 114 could be in wireless communication with a greater or fewer number of WCDs. In addition, the number of WCDs in wireless communication with BS 114 can change over time, for example, as a result of one or more WCDs moving into or out of the wireless coverage area of BS 114 and/or as a result of one or more WCDs beginning or ending communication sessions.

Each of air interfaces 124-130 could include a respective uplink, with which a WCD can transmit data to BS 114, and a respective downlink, with which BS 114 can transmit data to a WCD. The communications over air interfaces 124-130 could conform to any wireless protocol now known or later developed. For purposes of illustration, the communications over air interfaces 124-130 will be described herein with respect to the LTE protocol.

Wireless network 112 may provide connectivity with one or more transport networks 132, which could include, for example, the public switched telephone network (PSTN) and/or the Internet or other packet-switched networks. With this arrangement, a WCD being served by BS 114 may engage in a communication session, via wireless network 112, with an endpoint connected to one of transport networks 132. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 116, 118, 120, or 122, is involved in a communication session, the WCD may transmit data over an uplink channel to BS 114 and may receive data from BS 114 over a downlink channel. In some cases, the communication session could be one that involves a user of the WCD, such as a voice communication application or Web browsing application. In other cases, the communication session could involve a background task, such as periodically registering with wireless network 112.

In some implementations, BS 114 may transmit data to WCDs 116-122 over a shared downlink channel. The usage of the shared downlink channel may be controlled by BS 114 or by some other entity in wireless network 112. For example, the LTE protocol defines a Physical Downlink Shared Channel (PDSCH) that a base station can use to transmit data to multiple WCDs that are operating in its wireless coverage area. Portions of the PDSCH may be allocated to particular WCDs in the form of downlink resource blocks. Similarly, the WCDs 116-122 may transmit to the BS 114 over a shared uplink channel, which may also be controlled by the BS 113 of another entity in the wireless network 112. For example, the LTE protocol defines a Physical Uplink Shared Channel (PUSCH) that WCDs can use to transmit data to a base station. Portions of the PUSCH may be allocated to particular WCDs in the form of uplink resource blocks.

Figure 2A:
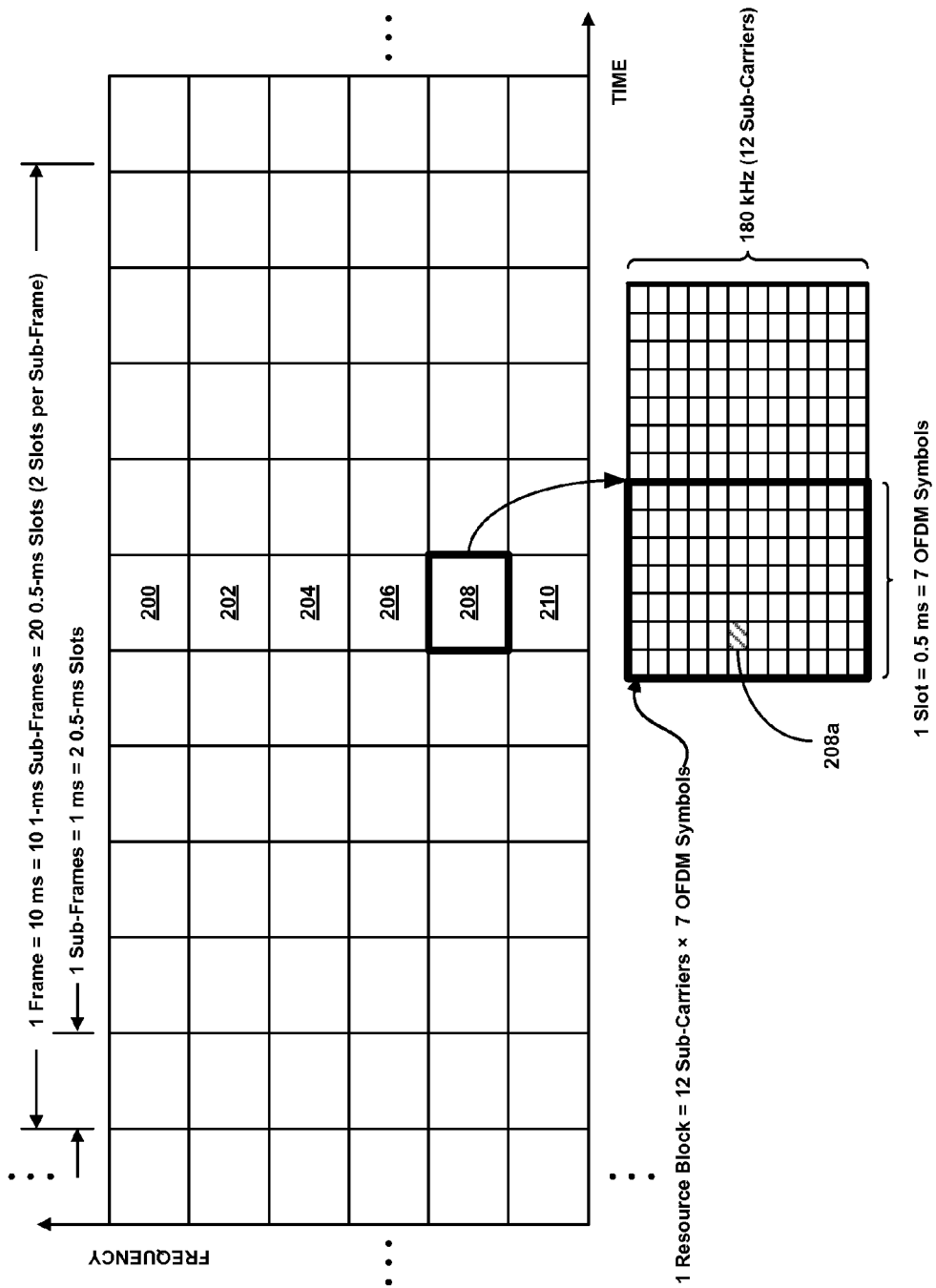
FIG. 2A is a conceptual illustration of a division of a shared channel into resource blocks, in accordance with an example embodiment.

FIG. 2A illustrates how the resources in a given wireless coverage area may be divided in time and frequency domains into resource blocks. In the time domain, each resource block occupies a 0.5 ms slot of a 1 ms sub-frame. Every group of 10 consecutive sub-frames makes up one transmission frame.

By way of example, FIG. 2A shows resource blocks 200-210 for a particular slot. In the frequency domain, each of resource blocks 200-210 occupies a respective portion of frequency bandwidth, typically 180 kHz in LTE implementations. Although FIG. 2A shows six resource blocks in each sub-frame, a wireless coverage area could have a greater number of resource blocks, as indicated by the vertical ellipses above and below resource blocks in the figure.

FIG. 2A also includes a more detailed view of the resource block 208. This detailed view shows that the 180 kHz of frequency bandwidth corresponds to 12 sub-carriers of 15 kHz each, and also shows that the 0.5 ms slot corresponds to the duration of 7 OFDM symbols (the number of OFDM symbols in a resource block can vary). The detailed view also depicts the slot 208 as half of one sub-frame.

Each OFDM symbol in a given resource block spans the 12 sub-carriers and includes a respective sub-carrier symbol on each sub-carrier. Thus, a resource block may be described as a set of resource elements, with each resource element corresponding to a sub-carrier symbol that is carried on a particular sub-carrier for the duration of one OFDM symbol, also referred to herein as a symbol transmission time. The detailed view of the resource block 208 in FIG. 2A shows the division of the resource block into multiple resource elements, such as resource element 208a.

Each sub-carrier symbol or resource element represents a data block of a certain number of bits, depending on the type of modulation that is used. For example, if Quadrature Phase Shift Keying (QPSK) is used for the sub-carrier symbols, then each sub-carrier symbol represents two bits of data. If Quadrature Amplitude Modulation (QAM) is used for the sub-carrier symbols, then each sub-carrier symbol represents a greater number of bits: four bits per symbol for 16QAM and six bits per symbol for 64QAM.

Figure 2B:
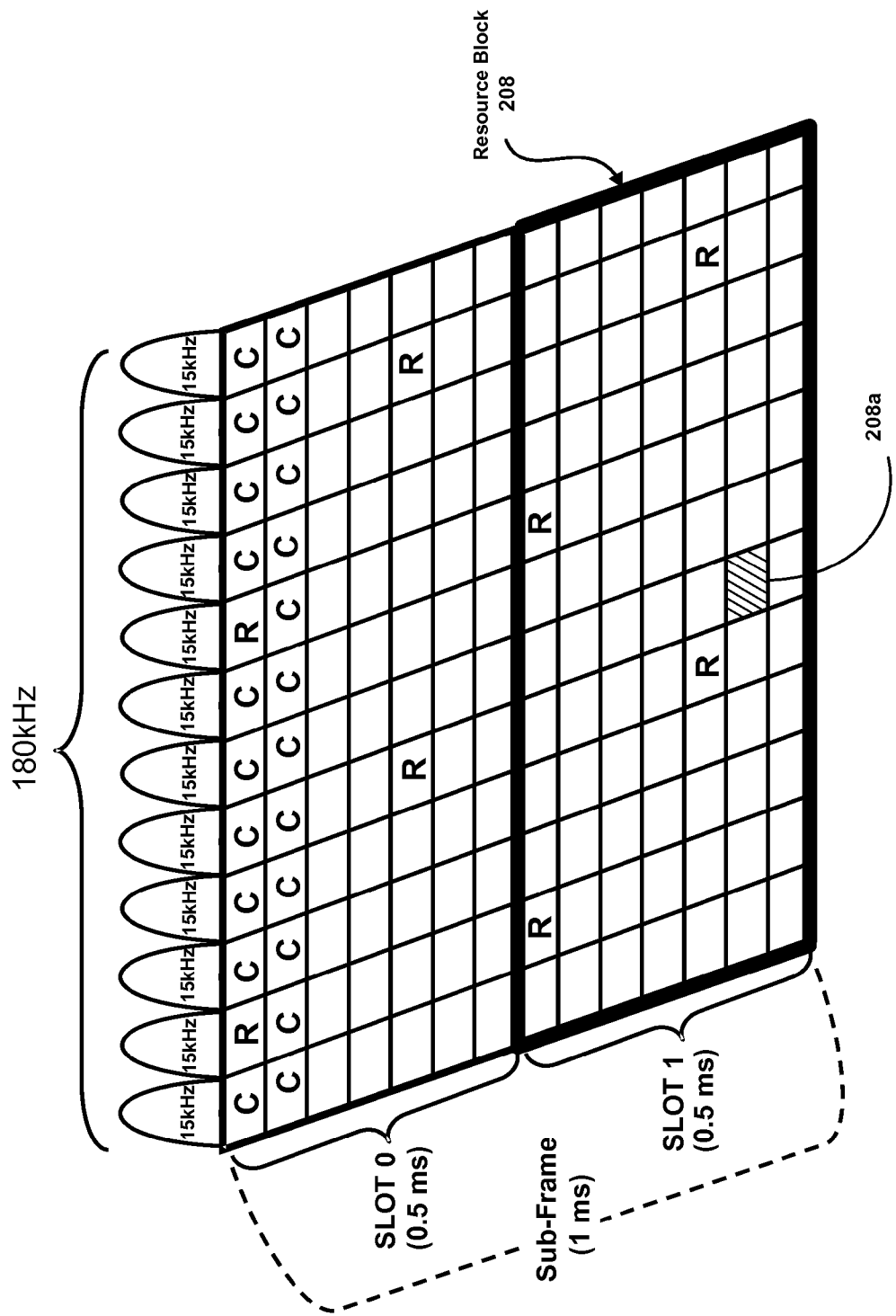
FIG. 2B is a conceptual illustration of a resource block, in accordance with an example embodiment.

Different resource elements in a resource block may be used for different purposes. FIG. 2B illustrates different functions among the 168 resource elements in two example downlink resource blocks of an example sub-frame for a one-antenna port system. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (PCFICH, PDCCH, and PHICH channels). The other 138 resource elements that are unlabeled can be used to transmit user data (PDSCH channel). It is to be understood that FIG. 2B illustrates only one possible configuration. In other configurations, a downlink resource block could have a greater or fewer number of resource elements available to transmit user data. In a similar manner, the PUSCH and PUCCH channels of an uplink resource block can be configured among specific resource elements of an one or more uplink resource blocks.

Figure 3:
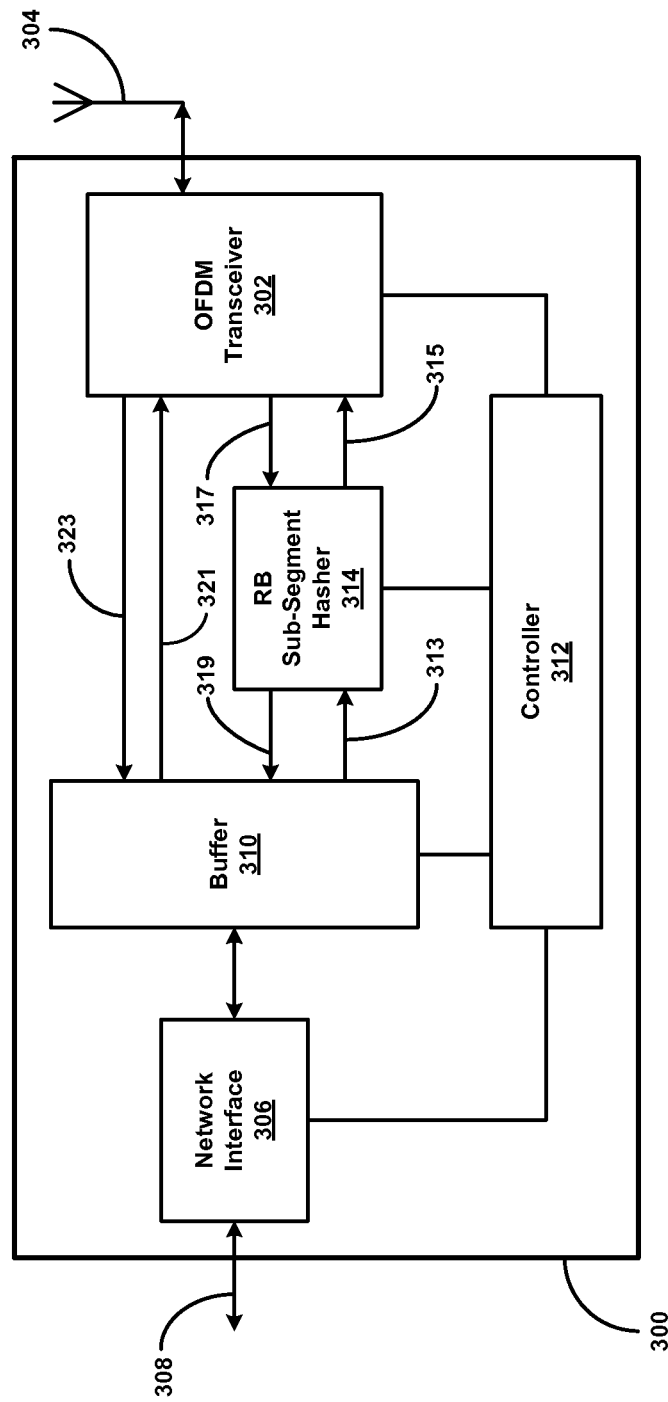
FIG. 3 is a functional block diagram of a base station, in accordance with an example embodiment.

FIG. 3 is a functional block diagram of an example base station 300, such as an eNodeB. Base station 300 could, for example, be part of a communication system as shown in FIG. 1. Thus, base station 300 could correspond to base station 114. For purposes of illustration, base station 300 will be described as using OFDM and resource blocks as shown in FIGS. 2A and 2B and described above. It is to be understood, however, that other types of air interfaces could be used.

As shown in FIG. 3, base station 300 includes an OFDM transceiver 302 for transmitting downlink data to WCDs operating in a wireless coverage area of base station 300 and for receiving uplink data from WCDs operating in the wireless coverage area. The transmissions and/or receptions could occur through one or more antennas (either directional or omni-directional), as exemplified by antenna 304. As described in more detail below, an OFDM transmitter of the transceiver 302 is configured to receive a data stream, generate OFDM symbols from the data stream, and transmit the OFDM symbols in one or more downlink resource blocks. Similarly, an OFDM receiver of the transceiver 302 is configured to receive one or more uplink resource blocks from one or more WCDs, detect OFDM symbols in the received resource blocks, and generate a one or more streams of received data for further transport in backhaul network, for example. The base station 300 can also include a resource block (RB) sub-segment hasher 314 for managing assignments of different sub-segments of a resource block allocated to multiple WCDs at the same time, as described in more detail below.

Base station 300 includes a network interface 306 for receiving and transmitting data over a backhaul connection 308 that connects base station 300 to one or more entities in a wireless network. The backhaul connection 308 can include wireless and/or wireline communication links. The data that base station 300 receives via backhaul connection 308 and network interface 306 can include data for one or more WCDs operating in its wireless coverage area. Similarly, the base station 300 can transmit data received from one or more WCDs to one or more entities in the wireless network via the backhaul connection 308. Base station 300 may accumulate such data, for example, in a buffer 310, for subsequent transmission to or from WCDs.

A controller 312 in the base station 300 may control the transmission of data in buffer 310 to WCDs using an OFDM transmitter in the transceiver 302. For example, the controller 312 may allocate downlink resource blocks to WCDs and schedule the transmission of data by the OFDM transmitter based on the allocated resource blocks. Similarly, the controller 312 may control the reception of data from WCDs using an OFDM receiver in the transceiver 302. For example, controller 312 may allocate uplink resource blocks to WCDs such that transmission of data by the WCDs is effectively scheduled according to the particular uplink resource blocks allocated. The OFDM receiver can then receive the data in the resource blocks from the WCDs and collect received data in the buffer 310.

The controller 312 could be implemented using hardware, software, and/or firmware. For example the controller 312 could include one or more processors and a non-transitory computer readable medium (e.g., volatile and/or non-volatile memory) that stores executable instructions. The executable instructions, when executed by the one or more processors, may cause the controller 312 (and/or the base station 300) to perform any of the base station functions described herein.

In accordance with example embodiments, when allocating a resource block, the controller 312 may determine if the resource block can be shared by two or more different WCDs at the same time. For example, the determination may take account of the transmission bit rate that can be supported on the respective air interface link to each of two or more particular WCDs, as well as the required or preferred bit rate for supporting current communication needs of the two or more WCDs. The communication needs of each WCD could, for instance, depend on the types of applications or programs running on each WCD that consume or generate the data in download or upload transmissions. As described below, other circumstances can arise in which current communication needs can be met using shared resource blocks. If the transmission bit rate that can be supported on the respective link to each of the two or more particular WCDs is large enough to simultaneously accommodate the needs of the two or more WCDs, then the controller 312 can the allocate the resource block to the two or more WCDs at the same time. In particular, if the transmission bit rate that can be supported on the respective link to each of the two or more particular WCDs is more than each WCD requires alone, such that allocating the resource block to just one of the WCDs would result in unused transmission capacity, then shared allocation can avoid inefficient use of transmission capacity.

For instances in which the controller 312 allocates a downlink resource block to two or more WCDs, the buffer 310 may be caused to direct an output data stream 313 to the RB sub-segment hasher 314. More particularly, the data stream 313 can contain data intended for transmission to two or more WCDs. In accordance with example embodiments, the data for each WCD could be in the form of a bit stream, and the RB sub-segment hasher 314 can apply a hash function to a digital identifier of each of the WCDs in order to determine a different sub-segment of the allocated downlink resource block to assign to each respective WCD. The RB sub-segment hasher 314 can then generate a sequenced bit stream 315 such that the data can be modulated in a specified order that causes the modulated data for each respective WCD to be populated into the assigned sub-segment for the respective WCD. Data in the shared downlink resource block can thus be transmitted simultaneously to the two or more WCDs. As described below, each of the two or more WCDs can subsequently demodulate the data in the common-allocated downlink resource block and recover its respective bit stream from its assigned sub-segment.

For instances in which the controller 312 allocates an uplink resource block to two or more WCDs, the RB sub-segment hasher 314 can similarly apply a hash function to a digital identifier of each of the WCDs in order to determine a different sub-segment of the allocated uplink resource block to assign to each respective WCD for carrying their respective uplink transmission. Upon the receiver receiving uplink data from the WCDs that share the commonly allocated uplink resource block, the RB sub-segment hasher 314 can then recover demodulated data from each respective WCD in the bit stream 317. Using the sub-segment assignments corresponding to the hash function, the RB sub-segment hasher 314 can generate a sequenced bit stream 319 that can be organized according the sub-segments, and therefore the WCDs that transmitted the data carried in the different sub-segments. The sequenced bit stream 319 can be delivered to the buffer 310 in preparation for transmission to the network.

For instances in which the controller 312 allocates a downlink resource block for just one WCD, modulation and transmission may be carried out conventionally. Thus, the buffer 310 may be caused to direct a conventional output data stream 321 to the OFDM transmitter 302. In this case, the conventional output data stream 321 can be a bit stream carrying data for just one WCD, and the OFDM transmitter 302 can correspondingly modulate the data for the WCD. In accordance with example embodiments, the OFDM transmitter 302 could, however, modulate and transmit the data in the same way, regardless of whether or not a downlink resource block has been allocated for multiple WCDs or just one WCD. In other words, sharing of downlink resource blocks can be transparent to operation of the OFDM transmitter 302. Further details of OFDM transmitter operation are described below.

For instances in which the controller 312 allocates an uplink resource block for just one WCD, reception may be carried out conventionally. Thus, the OFDM transmitter 302 can receive and demodulate data in the uplink resource block, and then deliver a conventional bit stream 323 to the buffer 310. In this case, the conventional bit stream 323 can be a bit stream carrying data from just one WCD. In accordance with example embodiments, the OFDM transmitter 302 could, however, receive and demodulate the data in the same way, regardless of whether or not an uplink resource block has been allocated for multiple WCDs or just one WCD. In other words, as with sharing of downlink resource blocks, sharing of uplink resource blocks can be transparent to operation of the OFDM transmitter 302. Further details of OFDM receiver operation are described below.

In the example base station 300 described above, operation of the RB sub-segment hasher 314 may entail applying a hash function to a digital identifier of a WCD to determine which sub-segment of a shared resource block to assign to the WCD. In an alternative arrangement, the hash function can be applied by a different entity in the network, such as a base station controller or network switch.

In accordance with example embodiments, the hash operation may be applied prior to determining which of multiple WCDs may be allocated the same given resource block on a shared basis. This prior hashing operation can be done to ensure that no two WCDs are assigned the same sub-segment. More particularly, it may not be possible to guarantee that a given hash function applied to any two or more arbitrary but different digital identifiers will always result in designations of different sub-segments. Applying the hash operation prior to determining or selecting a specific plurality of WCDs for shared allocation of a resource block can thus identify instances in which hashing results in non-unique sub-segment designations for two or more of WCDs of the plurality. When this occurs, one of the two or more WCDs can be assigned the designated sub-segment of the shared resource block, while the other WCDs with duplicate sub-segment designators can be omitted from shared allocation of resource block. The omitted WCDs can then be considered for shared allocation of one or more different resource blocks, for example.

For shared allocation of a downlink resource block, the prior hashing operation can ensure that when the RB sub-segment hasher 314 generates a sequenced bit stream 315, only data for WCDs assigned different sub-segments will be included. For shared allocation of an uplink resource block, the prior hashing operation can ensure that only WCDs assigned different sub-segments will transmit using the shared resource block. Thus, when the RB sub-segment hasher 314 generates a sequenced bit stream 317, only data transmitted from WCDs assigned different sub-segments will be included.

Figure 4:
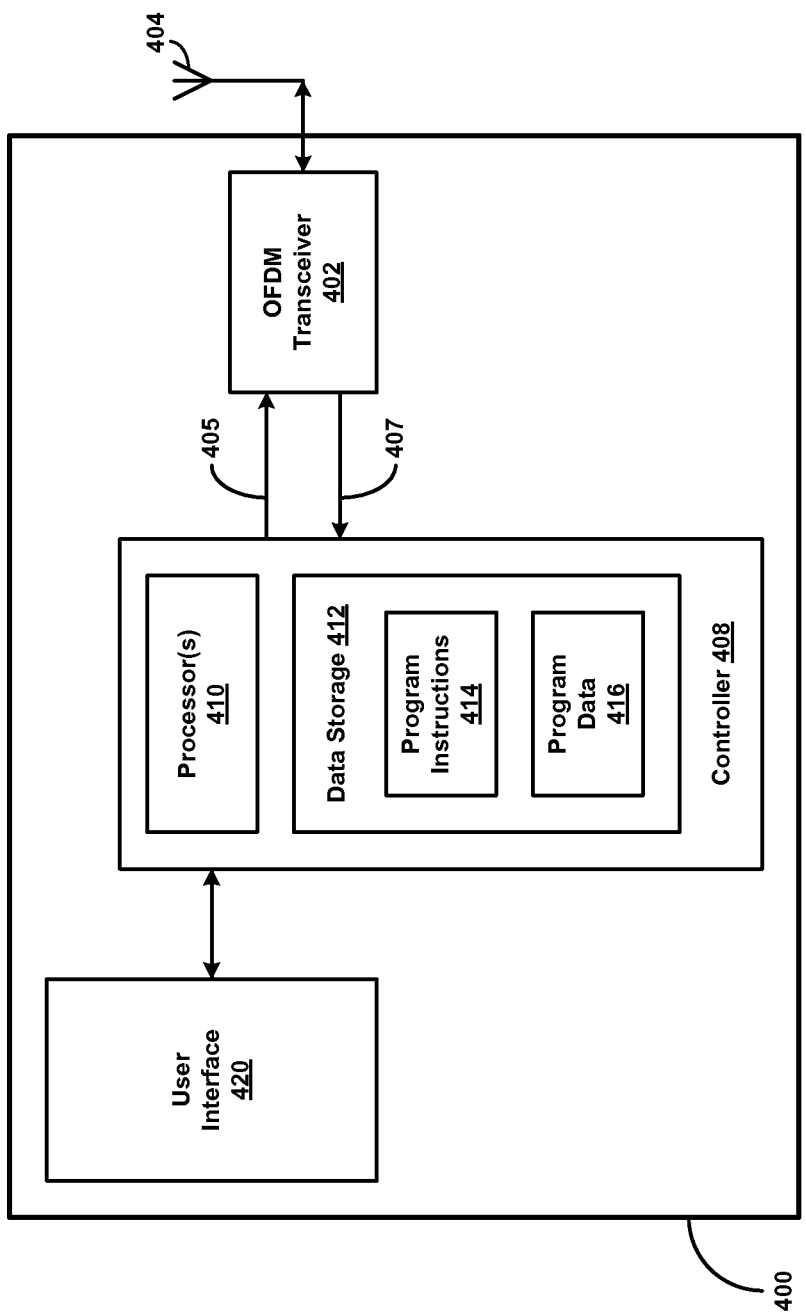
FIG. 4 is a functional block diagram of a WCD, in accordance with an example embodiment.

FIG. 4 is a functional block diagram of an example WCD 400. WCD 400 could, for example, correspond to any of WCDs 116-122 shown in FIG. 1. For purposes of illustration, WCD 400 will be described as using OFDM and downlink resource blocks as shown in FIGS. 2A and 2B. It is to be understood, however, that other types of air interfaces could be used.

As shown in FIG. 4, WCD 400 includes an OFDM transceiver 402 for receiving downlink communications from an OFDM communication system, such as base station 300, and for transmitting uplink communications from a base station. The receptions and/or transmissions could occur via one or more antennas, exemplified in FIG. 4 by antenna 404. The downlink communications could include downlink data contained in one or more downlink resource blocks. The downlink communications could also include control signaling, such as messages to inform the WCD 400 that one or more uplink and/or downlink resource blocks have been allocated to the WCD on a shared basis with one or more other WCDs.

An OFDM receiver of the transceiver 402 could function to recover data from OFDM symbols, for example, by performing the reverse of the operations performed by OFDM transmitter 302. As described in detail below, the OFDM receiver may receive an OFDM symbol spanning K sub-carriers, obtain time-domain samples of the OFDM symbol, and provide the time-domain samples in parallel to a Fast Fourier Transform (FFT) module. The FFT module outputs the K sub-carriers of the OFDM symbol, with each sub-carrier including a respective sub-carrier symbol. The OFDM receiver may then demodulate the sub-carriers to recover the data represented by the sub-carrier symbols. The data from the sub-carriers may be serialized to provide an output data stream 406.

An OFDM transmitter of the transceiver 402 could function to modulate data for transmission to a base station, such as the base station 300. As describe in more detail below, OFDM transmission can entail generating OFDM symbols from an input data stream, and transmitting the OFDM symbols in one or more uplink resource blocks that have been allocated to the WCD by a base station WCD 400 may also include a controller 408 that is configured to control the functioning of WCD 400. Controller 408 could be implemented using hardware, software, and or firmware. In one example, controller 408 includes one or more processors 410 and data storage 412. Data storage 412 could be any type of non-transitory computer readable medium, such as volatile and/or non-volatile memory. Data storage 412 may store program instructions 414 and program data 416. Program instructions 414 may be executable by processor(s) 410 to cause WCD 400 to perform operations, such as any of the operations described below with reference to FIG. 10. For example, program instructions 414 may include instructions for receiving signaling information from a base station indication one or more uplink and/or downlink resource blocks that have been allocated to the WCD, and for carrying out operations for transmitting OFDM data using a shared uplink resource block, and for receiving OFDM data in a share downlink resource block. Program data 416 could include any data that is generated or used in connection with the execution of any program instructions 414.

In accordance with example embodiments, the WCD 400 can apply a hash function to a digital identifier of the WCD in order to determine a designated sub-segment of a shared resource block that the WCD should use. More particularly, for uplink transmissions using a shared uplink resource block, the WCD 400 can ensure that OFDM data for transmission to the base station be populated in the sub-segment designated by the hash operation. Similarly, for downlink receptions using a shared downlink resource block, the WCD 400 can recover its data from the sub-segment designated by the hash operation. The program instructions 414 may also include instructions for generating an input data stream 405 to the OFDM transceiver 402 for transmission, and for receiving an output data stream 407 from the OFDM transceiver.

In some examples, program instructions 414 also include an operating system, communications protocols for communicating using LTE or some other type of air interface, and one or more applications that can be accessed by a user of WCD 400. Such applications could include a voice application for VoIP communications, an email application for email communications, a text application for text-based (SMS) communications, a Web application for accessing Web servers, and/or a media application for receiving streaming media from a media server. Other types of applications are also possible.

The data recovered from the output data stream 407 could be provided as input to one or more of such applications. Thus, the data recovered from the output data stream 407 could include voice data that is provided to a voice application, Web data that is provided to a Web application, streaming media that is provided to a media application, etc. Similarly, data supplied to the transceiver 402 in the input data stream 405 could be generated by one or more of such applications. Thus, the data supplied from the input data stream 405 could include voice data that is generated by a voice application, for example.

Some of the applications may be configured to use a user interface 420 in WCD 400. User interface 420 is configured to receive input from the user and to convey output from the user. For instance, user interface 420 may include a touch screen, a keypad, buttons, and or other controls for receiving input from the user. User interface 420 may also include a display screen for displaying textual and/or graphical information to the user. In addition, user interface 420 may include a microphone and speaker for voice communication.

2. EXAMPLE OPERATION

Shared allocation of resource uplink and/or downlink blocks for data communication between a base station and one or more WCDs and can be illustrated by considering example operation.

Figure 5:
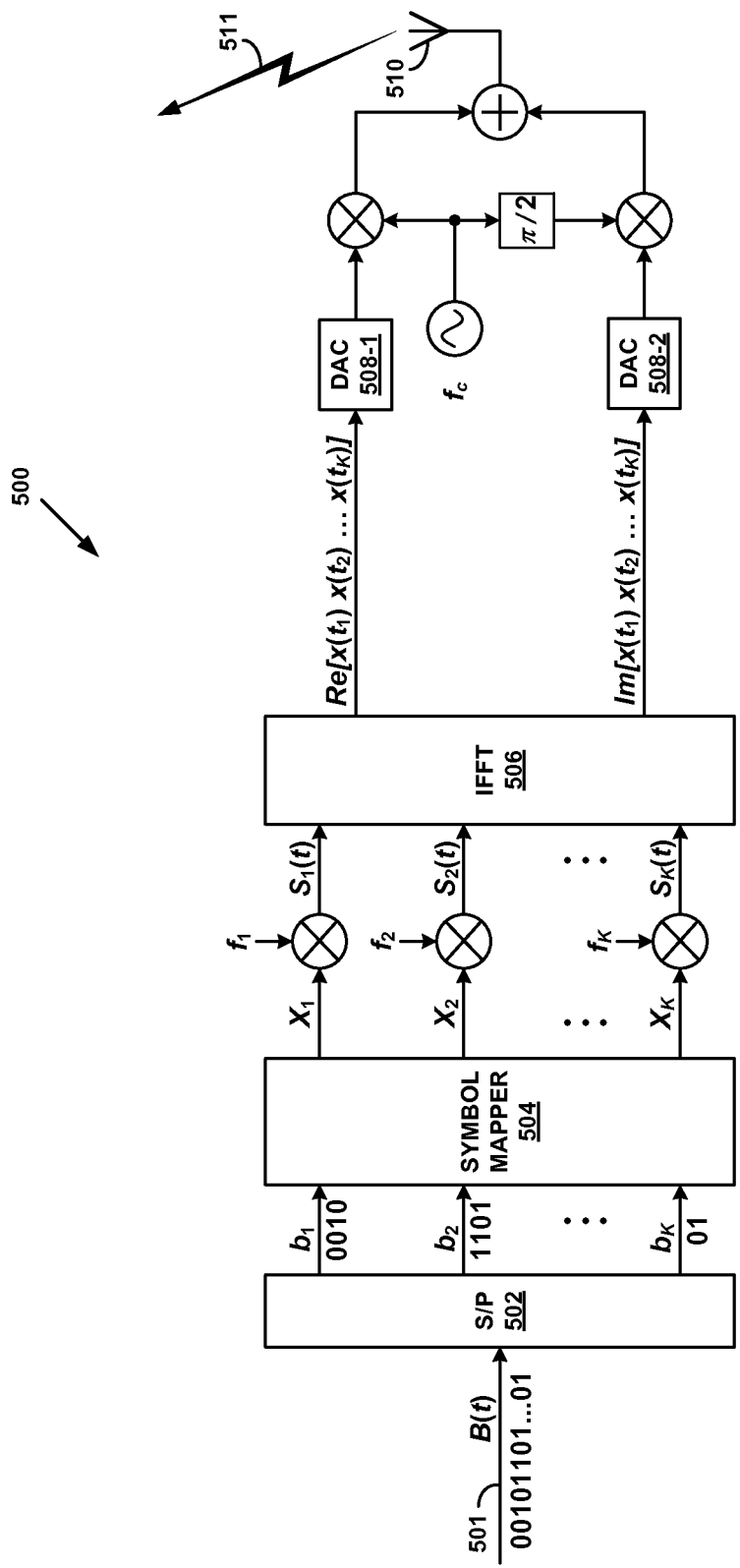
FIG. 5 is a functional block diagram of an OFDM transmitter, in accordance with an example embodiment.

FIG. 5 is a functional block diagram of an OFDM transmitter 500 that illustrates how a data stream 501 may be processed for transmission, according to an example embodiment. The OFDM transmitter 500 could correspond to an OFDM transmitter that could be part of the transceivers 302 and 402 in FIGS. 3 and 4, respectively, for example. The data stream 501 could be a sequenced bit stream for transmission to two or more WCDs, such as the sequenced bit stream 315. Alternatively, data stream 501 could be a data stream, such as the conventional output data stream 321 carrying data for just one WCD. The data stream 501 could also be described in connection with the output data 405. The illustration in FIG. 5 can be taken to represent a snapshot of operation during a time interval equal to one "symbol time," $T_{symbol}$, in which one OFDM symbol is generated from multiple frequency components carried on K sub-carriers.

The data stream 501 is represented as a serial bit stream in time B(t), where B is the bit value (0 or 1) and t is time. For purposes of illustration, only a portion of B(t) is depicted, with example bit values "00101101 . . . 01," where the ellipses represent additional, intervening bits in the serial stream. The particular values in the depiction are arbitrary, serving only to illustrate example operation. Also, in FIG. 5, time t in B(t) increases toward the right, so that bits "00" on the left in the example data stream 501 arrive at the transmitter at earlier times than the "01" bits that follow to the right of the ellipses.

In OFDM transmitter 500, data stream 501 is received by a Serial-to-Parallel (S/P) converter 502, where the serial data are divided into K parallel bit sub-streams for modulation onto K sub-carriers. The parallel bit sub-streams of data are identified as, $b_1, b_2, \ldots, b_K$, where the ellipses represent bit sub-streams between $b_2$ and $b_K$, not shown for the sake of brevity in FIG. 5. By way of example, $b_1$ contains the four leading bits 0010 of B(t), $b_2$ contains the next four bits 1101, and $b_K$ contains the last two bits 01 of B(t). As described below, the number of bits in each bit sub-stream corresponds to the number of bits that can be modulated onto the particular sub-carrier to which each bit sub-stream is directed, which, in turn corresponds to the number of bits per symbol. For each sub-carrier, the number of bits per symbol may depend, at least in part, on RF conditions affecting the particular sub-carrier at or near the time the transmission is scheduled. Since RF conditions can vary with time, the number bits per symbol supported by any given sub-carrier can correspondingly vary with time. As noted above, under LTE, the sub-carriers assigned to a given user typically use the same modulation scheme, and thus carry the same number of bits per symbol, during a given symbol time.

In accordance with example embodiments, the parallel bit sub-streams are input to a symbol mapper 504, which maps each respective bit sub-stream to a respective modulation symbol according to a respective modulation scheme appropriate for the number of bits in the respective bit sub-stream. By way of example, and to illustrate the use of possibly different modulation schemes on different sub-carriers, the four-bit sub-streams $b_1$ and $b_2$ will each be mapped using 16-QAM and the two-bit sub-stream $b_K$ will be mapped using QPSK. These and/or other modulation schemes could be used for the other bit sub-streams not shown in the FIG. 5. For example, 64-QAM can be used to map a six-bit sub-stream to a 64-QAM symbol, and 256-QAM can be used to map an eight-bit sub-stream to a 256-QAM symbol. Other modulation schemes could be used as well. As noted, the number of bits in each of the K sub-streams can be adjusted by a controller/scheduler based on RF conditions, for example.

The output of the symbol mapper 504 are K data symbols, labeled $X_1, X_2, \ldots, X_K$, each corresponding to a modulation-mapping of a respective input bit sub-stream. As shown in FIG. 5, each respective data symbol is then modulated by a respective one of the K sub-carriers $f_1, f_2, \ldots, f_K$ to generate a corresponding one of K sub-carrier data symbols $S_1(t), S_2(t), \ldots, S_K(t)$. Each sub-carrier data symbol $S_n(t)$, $n=1, \ldots, K$, is a different one of the $X_n$, $n=1, \ldots, K$, modulated at each of K consecutive sample times by a respective one of the K sub-carrier frequencies. Thus, each sub-carrier data symbol $S_n(t)$ in FIG. 5 corresponds to a stream of K time samples, and the K sub-carrier data symbols $S_1(t), S_2(t), \ldots, S_K(t)$ constitute K concurrent, parallel streams.

In practice, the modulation process multiplies each respective data symbol $X_n$ by a respective sinusoidal function of both a respective one of the frequencies $f_1, f_2, \ldots, f_K$ and time at each of K evenly-spaced time steps, or "sampling times," spanning one unit of $T_{symbol}$. In accordance with example embodiments, each sub-carrier frequency is an integer multiple of a fundamental baseband frequency $f_0=1/T_{symbol}$, so that $f_1=1 \times f_0$, $f_2=2 \times f_0$, $\ldots$, $f_K=K \times f_0$. The integer-multiple relation of the sub-carrier frequencies $f_k=k \times f_0$, $k=1, \ldots, K$, makes the set of the K sub-carriers (and the K sinusoidal modulation functions) orthogonal. The sampling times are given by $t_n = n \times \Delta t$, $n=1, \ldots, K$, where the sampling time step $\Delta t$ is given by $\Delta t = T_{symbol}/K$.

In accordance with example embodiments, at sample time $t_n$ the sinusoidal function with sub-carrier frequency $f_k$ can be expressed as $\exp(-j2\pi f_k t_n) = \cos(2\pi f_k t_n) - j \sin(2\pi f_k t_n)$, where $j = \sqrt{-1}$. With $f_k$ and $t_n$ defined as above, the sinusoidal function can be rewritten in the simpler and more computationally convenient form of $\exp(-j2\pi nk/K)$.

For the example LTE system described above, $\Delta f=15$ kHz, which corresponds to the bandwidth of each sub-carrier. The symbol time is therefore $T_{symbol}=66.7$ microseconds (µs) However, other bandwidths and corresponding sampling time steps could be used. As noted above, the size of each time step $\Delta t$ depends on the total number of samples K according to the relation $\Delta t = T_{symbol}/K$. For example, for a total bandwidth of 1.4 MHz, K=128; for a total bandwidth of 3 MHz, K=256; and for a total bandwidth of 20 MHz, K=2048. Note that LTE can support total bandwidths of 5, 10 and 15 MHz as well, with K=512, 1024, and 1536, respectively.

Continuing with the example operation illustrated in FIG. 5, an OFDM symbol is formed from the K sub-carrier data symbols $S_1(t), S_2(t), \ldots, S_K(t)$ of one symbol time $T_{symbol}$ by processing the sub-carrier data symbols through an Inverse Fast Fourier Transform (IFFT) module 506, which generates a set of K time-domain digital samples $x(t_n)$, where, again, $t_n = n \times \Delta t$, $n=1, \ldots, K$. Each digital sample $x(t_n)$ now corresponds to a superposition of sub-carrier frequency components at one of the sample time. Thus, whereas each of the sub-carrier data symbols $S_1(t), S_2(t), \ldots, S_K(t)$ is carried on an individual sub-carrier, the resulting OFDM symbol spans the K sub-carriers and is serialized in time. That is, in addition to computing an inverse Fourier transform on the K sub-carrier data symbols, the IFFT module 506 also acts as a parallel-to-serial converter, converting the K parallel streams to the time-serial stream $x(t_n)$.

Each of the $X_1, X_2, \ldots, X_K$ data symbols is a complex number, having a real part and an imaginary part. Therefore, each of the K sub-carrier data symbols $S_1(t), S_2(t), \ldots, S_K(t)$ is a stream of complex numbers, and the K time-domain digital samples $x(t_n)$, $n=1, \ldots, K$, output by the IFFT module 506 are also complex numbers. In accordance with example embodiments, the real and imaginary parts of $x(t_n)$, $n=1, \ldots, K$, can be output in two separate streams of digital samples. This is indicated in FIG. 5, where the real part of the digital sample stream is labeled $\text{Re}[x(t_1) \, x(t_2) \ldots x(t_K)]$, and the imaginary part is labeled $\text{Im}[x(t_1) \, x(t_2) \ldots x(t_K)]$.

Each of the two digital streams is then converted to a respective analog signal, and both analog signals are up-converted to a common carrier frequency $f_c$, but with a relative phase offset of 90° between the two up-converted signals. By way of example in FIG. 5, the real part of the digital sample stream is converted to an analog signal by the digital-to-analog converter (DAC) 508-1, and the imaginary part is converted to an analog signal by the digital-to-analog converter (DAC) 508-2. The up-conversion is achieved by multiplying each analog signal by a carrier signal of frequency $f_c$, but with a different one of two 90°-offset phases (indicated as $\pi/2$ in the figure). For example, one phase of the carrier signal can be sine of $f_c$ and time, and the other phase can be a cosine of $f_c$ and time. The two up-converted analog signals are then added, and the summed signal is transmitted in the signal 511 by the antenna 510 of the OFDM transmitter 500, as illustrated.

The OFDM symbol formed during one symbol time $T_{symbol}$ as described above is a frequency superposition of all the K symbols output by the symbol mapper 504, and thus spans all the K sub-carriers of a given OFDM downlink or uplink. In conventional operation under LTE, the smallest unit of resources that is allocated to a WCD on an uplink or downlink at any one time is one resource block. As noted above, this allocation unit spans 12 sub-carriers and seven OFDM symbol times (one slot). In general, the total number of sub-carriers transmitted is larger than the 12 of one resource block. That is, typically K>12. For example, in a 1.4-MHz bandwidth mode, six resource blocks are transmitted in each slot. This corresponds to 72 sub-carriers (as described below, K can exceed the number of sub-carriers that are actually transmitted).

Allocation of a particular resource block to a given WCD can therefore correspond to allocating a particular sequence of 12 consecutive sub-carriers out of the K total sub-carriers. However, the given WCD will receive all the K transmitted sub-carriers in a given downlink transmission, and will use them all to demodulate the received signal, as described below. Similarly, on transmission a given WCD will transmit on all the K sub-carriers. After demodulation, the WCD can retain only the resource elements corresponding to the 12 consecutive sub-carriers of its allocated downlink resource block (as well as any others from possibly other allocated resource blocks). In this sense, at least one sequence of 12 consecutive sub-carriers among the K sub-carriers $f_1, f_2, \ldots, f_K$ illustrated in FIG. 5 belongs to one downlink resource block. In accordance with example embodiments, and as will be described below, a given resource block can, unlike under conventional operation, be allocated simultaneously to two or more WCDs.

Referring again to FIGS. 2A and 2B, one OFDM symbol carries a frequency superposition of all the resource elements scheduled for transmission during a given symbol time. As such, one OFDM symbol can span the resource elements of all the resource blocks during the given symbol time. The procedure represented in the snapshot illustrated in FIG. 5 above can be repeated at successive symbol times, such that for LTE, every seven consecutive OFDM symbol transmissions aligned with a given slot boundary span, in frequency and time, all the resource blocks of the given single slot. Similarly, every 14 consecutive OFDM symbol transmissions aligned with a given sub-frame boundary span, in frequency and time, all the resource blocks of the given single sub-frame, and so on.

Note that it is sometimes customary to refer one OFDM symbol as spanning just the 12 sub-carriers of a single given resource block. This can be a convenient way of descriptively associating OFDM symbols with individual resource blocks. However, at a computational level, the IFFT superposition is still carried out over all the sub-carriers of the air interface, which can include sub-carriers above and below (in frequency space) the sub-carriers of the given resource block.

Although not necessarily shown in FIG. 5, each OFDM symbol formed as described above can also include a cyclic prefix to help mitigate inter-symbol interference that may be caused by multipath propagation during transmission. Under LTE, a cyclic prefix can be formed by duplicating the last P of the K time-domain digital samples $x(t_n)$, n=1, . . . , K, output by the IFFT and pre-pending them to beginning of the OFDM symbol. The resulting OFDM symbol plus cyclic prefix will be of slightly longer duration than the symbol time $T_{symbol}$. More particularly, one 0.5-ms slot divided by seven OFDM symbols per slot corresponds to approximately 71.4 µs per OFDM symbol in time. As noted above, $T_{symbol}=1/\Delta f=66.7$ µs. The difference of approximately 4.8 µs corresponds to the cyclic prefix added to each OFDM symbol prior to analog conversion and transmission. In practice, the cyclic prefix pre-pended to the first OFDM symbol of a slot is slightly longer than that pre-pended to the following six OFDM symbols of the slot. This can help distinguish the slot boundary for a device (e.g. a WCD) that receives the transmission.

While the number K of time samples per symbol time is the same as the number K of sub-carriers, not all of the sub-carriers are necessarily used in transmission of each OFDM symbol under LTE, even though all K time samples of the time-domain digital samples $x(t_n)$, n=1, . . . , K are generated and converted to an analog signal for transmission. In addition, not all of the transmitted sub-carriers are necessarily associated with resource blocks. For example, for the 1.4-MHz channel bandwidth mode of LTE, only 76 of K=128 sub-carriers are transmitted, 72 of them associated with six resource blocks (6×12=72). Thus, the 76 transmitted sub-carriers, each 15 kHz wide, occupy approximately 1.14 MHz of the 1.4 MHz available for transmission. Mathematically, this is equivalent to setting 52 of the symbol values $X_n$, n=1, . . . , 128, equal to zero (where 76=128−52). The omitted 52 sub-carriers can serve as guard sub-carriers, since the frequency space that would be occupied if they were transmitted is instead empty. Similarly, for the 3-MHz channel bandwidth mode of LTE, only 151 of K=256 sub-carriers, occupying 2.265 MHz of the available 3 MHz, are transmitted; 105 sub-carriers serve as guard sub-carriers. The 5, 10, 15 and 20-MHz modes also utilize guard sub-carriers. Note that for purposes of illustration, and without loss of generality, FIG. 5 (and other figures herein that similarly represent sub-carriers) depicts all K sub-carriers as if all are transmitted.

Figure 6:
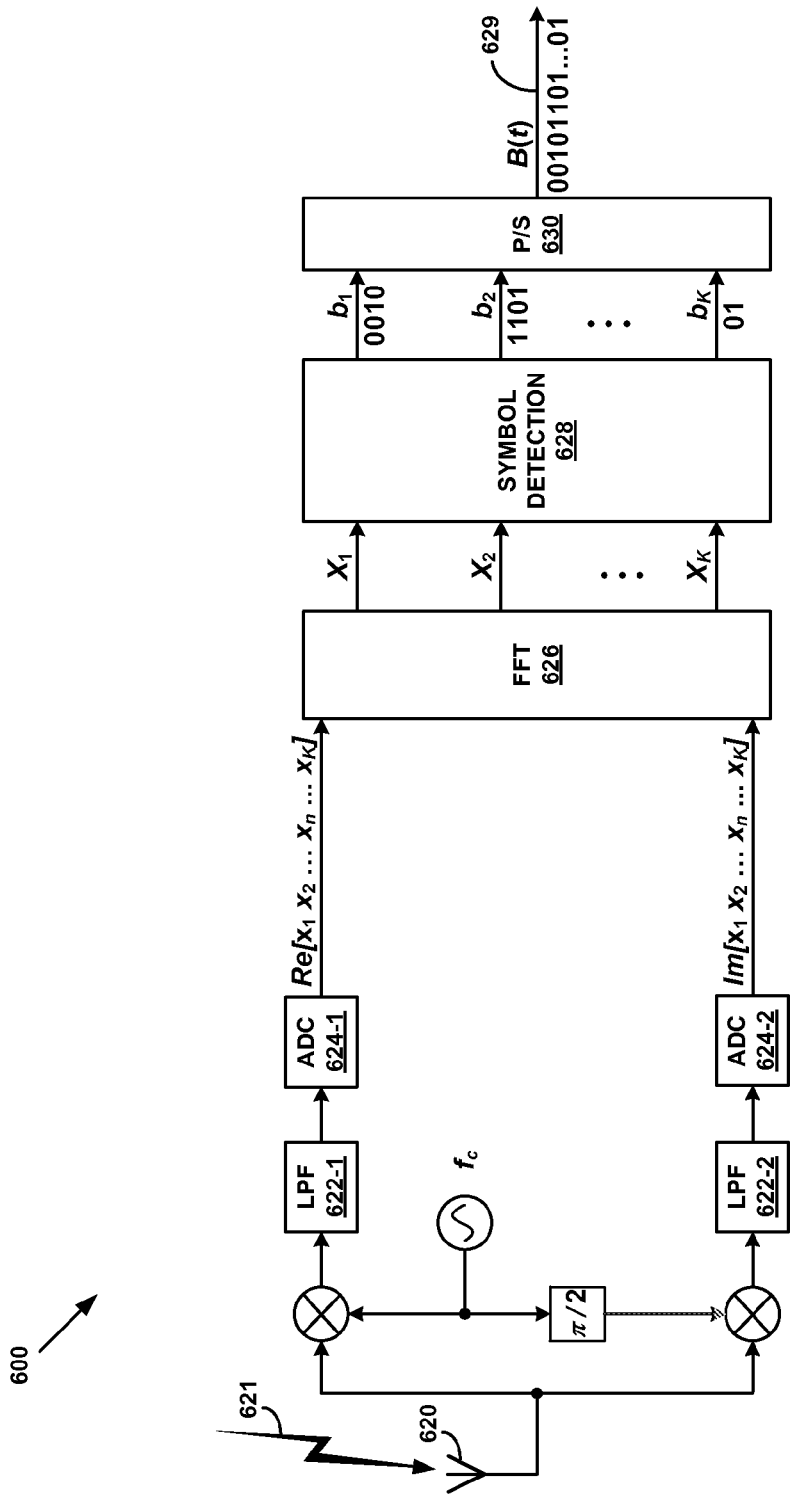
FIG. 6 is a functional block diagram of an OFDM receiver, in accordance with an example embodiment.

FIG. 6 is a functional block diagram of an OFDM receiver 600 showing further details of reception and OFDM demodulation, in accordance with an example embodiment. The OFDM receiver 600 could correspond to an OFDM receiver in the OFDM transceivers 302 and 402 in FIGS. 3 and 4, respectively, for example. The operation illustrated in FIG. 6 is somewhat idealized in the sense that potential degrading effects such as noise and multipath transmission are ignored for the moment. In practice an OFDM receiver, such as the one in FIG. 6, can include additional components and procedures for mitigating these effects (e.g., cyclic prefixes, error correction, etc.).

As shown, an analog signal 621 is received by an antenna 620. The received analog signal 621, which could correspond to the transmitted signal 611, for example, is directed onto two different paths, and in simultaneity, the analog signal on each path is multiplied a sinusoidal signal of frequency $f_c$, but with a different one of two 90°-offset phases (indicated as π/2 in the figure). The process effectively picks out the real component from one signal path (the top path in the FIG. 6) and picks out the imaginary component from the other signal path (the bottom path in the FIG. 6). The real component is passed through a low-pass-filter (LPC) 622-1 that outputs a baseband analog signal of the real component, and the imaginary component is passed through a LPC 622-2 that outputs a baseband analog signal of the imaginary component. The baseband analog signal of the real component is then passed through an analog-to-digital converter (ADC) 624-1 to generate digitized samples of the input signal, labeled in FIG. 6 as Re[$x_1$ $x_2$ . . . $x_n$ . . . $x_K$]. Similarly, the baseband analog signal of the imaginary component is passed through an ADC 624-2 to generate digitized samples of the input signal, labeled in FIG. 8 as Im[$x_1$ $x_2$ . . . $x_n$ . . . $x_K$].

The real and imaginary digital sample streams are then processed through the FFT module 626, which computes and outputs a parallel streams of complex modulation symbols $X_1, X_2, \ldots, X_K$, each on one of the K sub-carriers. This reverses the IFFT processing carried out by the OFDM transmitter. Under idealized conditions of perfect (error-free) transmission, the received version of $X_n$ will the same as the transmitted version. In practice, this will not generally be the case. However, for the purposes of the present illustrative example, the agreement between the received and transmitted modulation symbols will be assumed be sufficient to result in accurate symbol demodulation.

The outputs of the FFT module 626 are input to a symbol detection module 628, which demodulates the complex modulation symbols $X_1, X_2, \ldots, X_K$ to recover K parallel bit streams $b_n$, n=1, . . . , K, as illustrated. The parallel bit streams are then input to a parallel-to-serial (P/S) converter 630, which generates a serial bit stream 629, represented by B(t). The received serial bit stream B(t)=001011010 . . . 01 will be the same as that transmitted by the OFDM transmitter.

Since input analog signal 621 can contain a continuous stream of frequency superpositions of modulated symbols, precise timing can be used by the OFDM receiver 600 to determine time boundaries of the symbols. In this way, the proper sequences of consecutive samples can be processed to recover serial demodulation symbol sub-streams, resulting bit sub-streams, and reconstructed serial bit streams. Under LTE, every seven consecutive received OFDM symbols aligned with a given slot boundary span, in frequency and time, all the resource blocks of the given single slot. Similarly, every 14 consecutive OFDM symbol transmissions aligned with a given sub-frame boundary span, in frequency and time, all the resource blocks of the given single sub-frame, and so on.

As noted above, each resource blocks corresponds to 12 consecutive sub-carriers. However, a serial bit stream corresponding to one OFDM symbol can correspond to all the K sub-carriers received. In practice, a receiver can identify the one or more sub-portions of a bit stream that corresponds to the sub-carriers in its one or more resource blocks. The receiver will nevertheless need to apply the FFT processing to all K time samples in Re[$x_1$ $x_2$ . . . $x_n$ . . . $x_K$] and Im[$x_1$ $x_2$ . . . $x_n$ . . . $x_K$] during each symbol time in order to recover the respective $X_n$ of each received resource block.

In conventional operation under LTE, the smallest unit of air interface resource that a base station will allocate a given WCD for either downlink or uplink communications is one resource block. For downlink communications, the base station signals the WCD ahead of time (typically by four frames) as to which upcoming downlink resource block(s) has (have) been allocated. The WCD can then receive and demodulate the data during the time interval(s) that contain the allocated downlink resource block, and can thereby recover its data. For uplink communications, the base station again signals the WCD ahead of time (typically by four frames) as to which upcoming uplink resource block(s) has (have) been allocated. The WCD can then modulate and transmit its data during the time interval(s) that contain the allocated uplink resource block.

As noted above, the conventional use of a resource block as a minimum allocation unit can sometimes lead to inefficient utilization of available bandwidth. More specifically, on transmission, resource elements of a resource block conventionally allocated to one WCD will be populated and transmitted in successive slots. Any remaining data after the resource block has been fully transmitted can be accommodated in one or more an additional resource block allocations. However, if the data being transmitted runs out before the allocated resource block is fully transmitted, then the remaining resource elements of the allocated resource block will be transmitted, slot-by-slot, empty of any modulated data. These empty resource elements thus represent unutilized bandwidth.

Empty resource elements can occur, for example, if a data rate required for a given purpose (either uplink or downlink) is less than the data rate supported on the air interface at the time transmission is scheduled. For instance, RF conditions at a given time might support a high modulation scheme (e.g., 64-QAM) on an air interface link, and thus more bits per symbol (resource element). Similarly, data being transmitted might fill some of multiple allocated resource blocks, but leave one or more other allocated resource blocks only partially used. These are just a few example of circumstances in which conventional allocation of resource blocks to just one WCD at a time can lead to inefficient use and/or underutilization of available bandwidth. It would therefore be desirable to be able to mitigate this type of inefficient use and/or underutilization, in particular by enabling sharing among two or more WCDs of a resource block.

In accordance with example embodiments, one or more resource blocks can each be allocated to two or more WCDs for shared use by sub-dividing each resource block into specific, non-overlapping sub-segments, and assigning each of the two or more WCDs different ones of the sub-segments. Each sub-segment can be made up of a different set or grouping of resource elements of a resource block. By appropriately populating resource elements of such a shared resource block with data associated with each of the two or more WCDs, the single shared resource block can effectively be arranged to carry data associated with the two or more WCDs. A hash function applied to a digital identifier of each of the two or more WCDs can ensure that no two WCDs are assigned the same sub-segment. Further, the hash function can be applied by both a base station and the two or more WCDs so that both senders and receivers have the same information about sub-segment assignments. As described in more detail below, this sub-segment sharing can be achieved for both uplink and downlink transmissions.

As noted above, a given resource block designated for sharing can be sub-divided into two or more sub-segments, each made up of a different grouping of resource elements, such that no two sub-segments contain any of the same resource elements. The sub-segments of any given resource block designated for sharing can be specified in a sub-segment map that can be used by a base station or a WCD (or other network device) to determine the sub-segment organization of the given resource block. One example format of a sub-segment map for shareable resource blocks can be a table of sub-segment indexes that identify each sub-segment by a simple numerical index or the like, and a list of resource element indexes associated with each identified sub-segment. Each resource element index could encode a particular one of the 12 sub-carriers of the resource block and a particular one of the symbol times, for example. In this way a given sub-segment index can be used to determine all the resource elements in the associated sub-segment. Sub-segment maps can be pre-configured, generated dynamically, or both; and maps can be stored in one or another form of memory, such as disk, solid state, or other form non-transient media storage.

In accordance with example embodiments, a base station (or other network entity involved in scheduling data transmissions) can determine that upcoming data transmissions between the base station and two or more WCDs being served by the base station can be at least partly accommodated using one or more shared resource blocks. As a simple example, the base station might be scheduling downlink transmission to four WCDs such that each transmission can fill an integral number of downlink resource blocks plus a fraction of one more. The base station may also determine that the fractional amounts can fit into a single additional resource block. Thus, the base station can allocate one additional downlink resource block to all four WCDs on a share basis to carry the fractional amount of data to all four at the same time. Note that in conventional operation, the base station would have to allocate four additional resource blocks instead of just one.

This simple example can be adapted to describe uplink transmission as well. In this case, the base station may have received uplink scheduling requests from the four WCDs, including sufficient information to determine that one uplink resource block allocated to all four WCDs on a shared basis can accommodate at least a portion of the total data that, collectively, they have requested to transmit. These two simple examples are not intended to be exhaustive. Rather, they serve to illustrate that a base station (or other network entity involved in scheduling data transmissions) can generally predict air interface resource needs, and in particular, identify ahead of time circumstances in which share allocation to two or more WCDs of one or more resource blocks can be made. The number for of WCDs in the above two example serves only purposes of illustration, and is otherwise arbitrary; other number could serve these or a similar illustrations.

In accordance with example embodiments, a wireless communication system, such as the communication system 100 in FIG. 1, can designate certain resource blocks for shared allocation. The designated resource blocks can be organized in various ways. For example, they can be organized according to particular resource blocks spanning different, specific 12-sub-carrier groups within a given slot or frame; according to particular resource blocks spanning a given 12-sub-carrier group but in different, specific slot or frames; or according to some combination of both. In one example, designations of shareable resource blocks can be made on a per-base-station basis, such that some or all of a base station's shareable resource blocks can be designated as such by the base station. In still another example, it can be possible for a base station (or other network element) to dynamically designate certain upcoming resource blocks as shareable at certain times, and dynamically modify the designation at other times. A different sub-segment map can also be generated or pre-configured for each differently-defined sub-segment organization.

In accordance with example embodiments, WCDs operating in a coverage are of a base station can be provided with information indicating which resource blocks are designated for sharing, including which are designated as shareable uplink resource blocks and which are designated as shareable downlink resource blocks. In addition, the information can also include a sub-segment map for each designated resource block, or at least one map for each distinct type of mapping defined. The information can be pre-configured in the WCDs, for example as system information, when the WCDs first power on and register in the network. In addition, the information can be provided to the WCDs by a serving base station, for example in a broadcast message, or the like. A base station broadcast (or other message) can be use, in particular, for an arrangement in which designated shareable resource blocks can different for different base stations, or can be modified dynamically by one or more base stations.

When a WCD receives a control message allocating a particular one or more resource blocks—either uplink or downlink—for scheduling upcoming communications with the base station, the WCD can determine from the designation information which, if any, of the allocated resource blocks is a shareable resource block. For any allocated resource block that the WCD determines is shareable, the WCD will adapt its operations accordingly, as described below. Briefly, for an uplink resource block allocated on a shared basis, the WCD will use a hash operation to determine a particular sub-segment to use, and populate only the resource elements in that sub-segment when transmitting to the base station. For a downlink resource block allocated on a shared basis, the WCD will use the hash operation to determine a particular sub-segment that the base station will use for transmitting the WCD's data, and the WCD will recover its received data only from the resource elements in that sub-segment when receiving from the base station.

In complementary operations, the base station will use the same hash function as the WCDs in order to ensure that it transmits to each respective WCD sharing a downlink resource block in the same sub-segment that the respective WCD expects to recover its data from, as determined by the WCD's hashing operation. Similarly, the base station will use the same hash function as the WCDs in order to ensure that it recovers data from each respective WCD sharing an uplink resource block from the same sub-segment that the respective WCD transmits its data in, again as determined by the WCD's hashing operation.

In accordance with example embodiments, the hash function can be applied to a respective digital identifier of each WCD in order to designate a sub-segment for the WCD. By way of example, the digital identifier can be an International Mobile Subscriber Identity (IMSI) associated with the respective WCD, or an Electronic Serial Number (ESN) associated with the WCD. Other types of identifiers could be used as well. The output of the hash function could be an integer corresponding to a sub-segment index in a sub-segment map. Mathematical and algorithmic properties of hash functions are well known, and not discussed further herein, except to note certain typical properties. First, small variations of an input variable (e.g., an IMSI or ENS) can result is very large variations of output, so that similar inputs will typically yield dissimilar outputs. Second, a hash function can be arranged to output integer values in particular ranges. In particular, the range of outputs of a hash function and the range of sub-segment index values can be matched in the sense that each hash output can correspond to a valid sub-segment index value (or other form of sub-segment identifier). Third, a hash function can occasionally yield an identical output from different inputs. As described below, this property can be accounted for by ensuring any such occurrences are detected prior to allocation of a shared resource block so that potential, resulting, duplicate sub-segment assignments can be prevented.

When a base station determines that it can or should schedule some upcoming communication with a particular multiplicity of WCDs using one or more shared resource blocks, it can apply the hash function to the identifier of each respective WCD in the multiplicity. If all of the hash outputs are different, then the base station can allocate one or more of the shareable resource blocks to the multiplicity. For any hash output that is the same for any two or more WCDs in the multiplicity, the base station can retain one of the two or more WCDs for shared allocation, and omit the others with the duplicate hash output from shared allocation. Thus, the base station can determine a plurality of WCDs that each hash to a different sub-segment of a shareable resource block.

In this approach, the initial multiplicity of WCDs can be considered a superset of candidate WCDs for sharing, while the plurality of WCDs that the base station determines to have unique hash outputs can be considered a subset of the multiplicity. For any WCD of the superset (multiplicity) of WCDs excluded from the subset (plurality) because of non-unique hash output, the base station can try to accommodate shared resource block allocation in a different one of the designated shareable resource blocks. Note that the determination of the plurality of WCDs with unique hash outputs need not necessarily be made by a base station, but can be made by a different network entity involved in scheduling communications with WCDs. In this case, the base station can still also apply the hash function to the plurality of WCDs in order to designate respective sub-segments of a resource block allocated to the WCDs on a shared basis.

Once the base station determines the plurality of WCDs with unique hash outputs, it can allocate one or more shareable resource blocks to them. The base station can then signal each WCD in the plurality in the usual way with the allocation information. In the LTE approach, for example, the allocation of resource blocks to WCDs is communicated to the WCDs by the base station transmitting control signaling over the Physical Downlink Control Channel (PDCCH). The control signaling regarding allocation of a particular resource block could occur at the start of a slot that includes that particular resource block. As noted above, each WCD can then determine that it has been allocated one or more of the designated shareable resource blocks. Each WCD can then apply the hash function to determine which sub-segment to use, either for uplink transmission or downlink reception and data recovery.

Shared allocation among two or more WCDs of a resource block in accordance with example embodiments can be described by considering example operation. On transmission, by appropriately scheduling of modulation and transmission of one or more input data streams, an OFDM transmitter can effectively populate some or all resource elements of specific sub-segments of a resource block with specific data. Similarly, on reception, by appropriately timing of reception and demodulation of a received transmission, an OFDM receiver can recover some or all resource elements of specific sub-segments of a received resource block and thus recover specific data. Example operation of shared allocation of downlink and uplink resource blocks is illustrated respectively in FIGS. 7 and 8.

Figure 7:
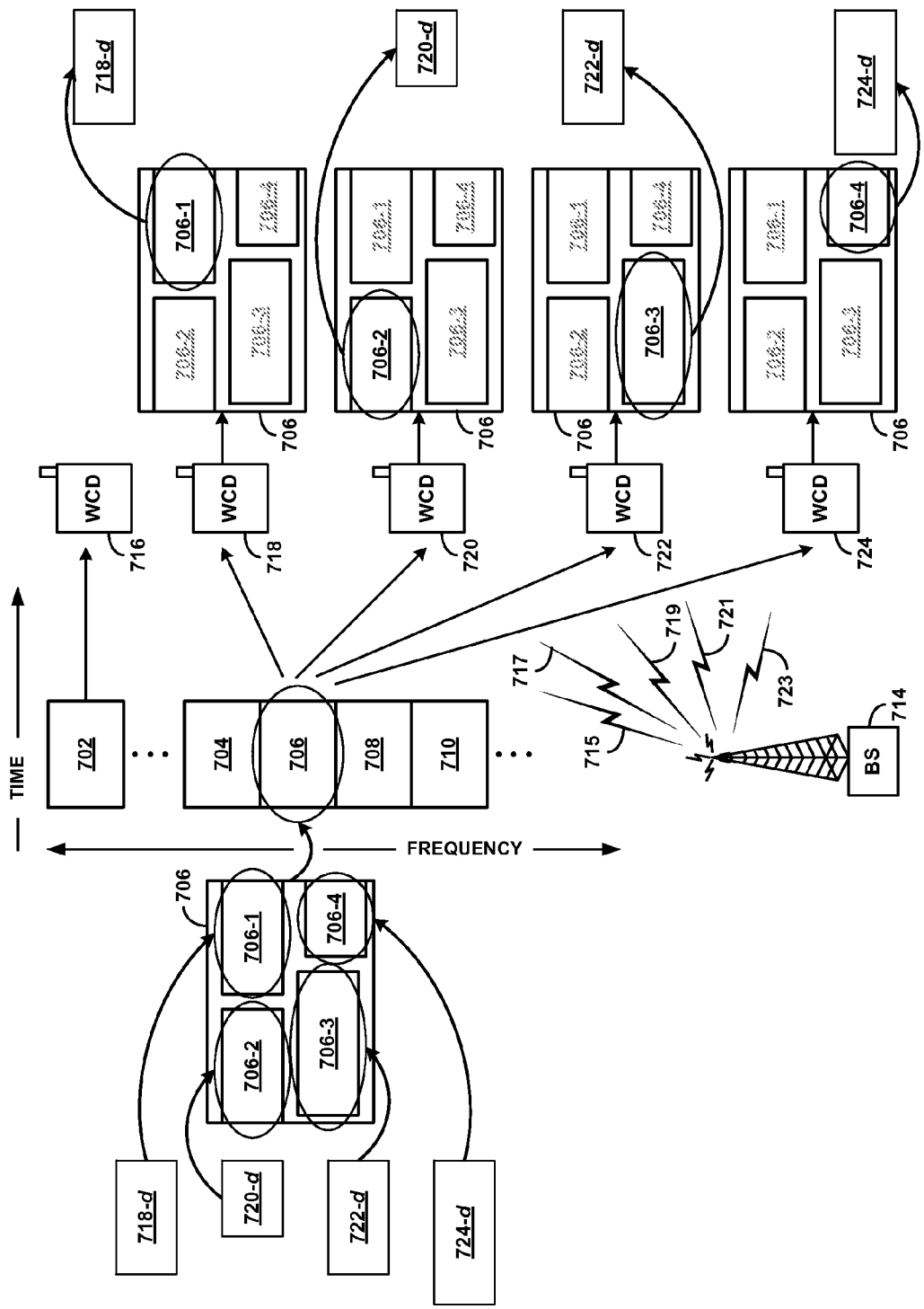
FIG. 7 is a conceptual illustration of shared allocation of a downlink resource block, in accordance with an example embodiment.

FIG. 7 is a conceptual illustration of shared allocation of a downlink resource block, in accordance with an example embodiment. As shown, a base station 714 communicates with WCDs 716, 718, 720, 722, and 724 by way of air interface links 715, 717, 719, 721, and 723, respectively. The illustration depicts a snapshot one slot during which representative downlink resource blocks 702, . . . , 704, 706, 708, 710, . . . are transmitted by the base station 714 and received by the WCDs 716-724. Frequency is shown on a vertical axis, spanning the resource blocks, and time is shown on a horizontal axis.

As illustrated by way of example, the downlink resource block 706 has been allocated to the WCDs 718-724 on a shared basis for transmission of respective data 718-*d*, 720-*d*, 722-*d*, and 724-*d*. Also by way of example, the shared resource block 706 is represented conceptually as including sub-segments 706-1, 706-2, 706-3, and 706-4. In the example illustration, the downlink resource block 702 has been allocated exclusively to the WCD 716. This arrangement is included to illustrate how some downlink resource blocks can be shared while others may not be. Although not necessarily shown explicitly in FIG. 7, the base station 714 can signal each WCD with information indicating the allocation of the downlink resource block 706. Then, in accordance with example embodiments, each of the WCDs 718-724 can determine that the uplink resource block 806 is designated for shared allocation.

Also in accordance with example embodiments, the base station 714 can apply a hash function to each of the WCDs 718-724 to determine which sub-segment to assign to each WCD. By way of example, the hash function applied to the WCD 718 evidently designates the sub-segment 706-1. Similarly, and also by way of example, the hash function applied to the WCD 720 evidently designates the sub-segment 706-2; the hash function applied to the WCD 722 evidently designates the sub-segment 706-3; and the hash function applied to the WCD 724 evidently designates the sub-segment 706-4. Thus, the base station 714 transmits the data 718-*d* for the WCD 718 in the sub-segment 706-1. Similarly, the base station 714 transmits the data 720-*d* for the WCD 720 in the sub-segment 706-2; the base station 714 transmits the data 722-*d* for the WCD 722 in the sub-segment 706-3; and the base station 714 transmits the data 724-*d* for the WCD 724 in the sub-segment 706-4. As described above, the operation of transmitting data in a particular sub-segment involves scheduling the modulation and transmission of the data to that it uses one or more resource elements within the particular sub-segment.

As indicated by the arrows from the shared resource block 706 to each of the WCDs 718-724, the base station 714 simultaneously transmits the resource block to all four WCDs. In practice, the transmission includes all the subcarriers in the carrier band used by the base station, as described above. The shared resource block 706 is singled out in FIG. 7 for purposes illustrating example operation, in accordance with example embodiments.

In accordance with example embodiments, each of the WCDs 718-724 will have been informed ahead of time (e.g., by four slots worth of time) that it has been allocated the resource block 706. Each can then determine that this resource block is allocated on a shared basis, and thus each WCD will then apply the same hash operation as the base station 714 did when assigning sub-segments to of the WCDs. Thus, each WCD will determine which sub-segment of the shared resource block it was assigned. Accordingly, the WCD 718 is shown as receiving a transmission of the resource block 706 and recovering its data 718-*d* from the sub-segment 706-1. Note that the other sub-segments in the shared resource block 706 received by the WCD 718 are depicted in gray text. This is a visual cue indicating the sub-segments as present in the shared resource block, but are not recovered by the WCD 718 since it was not assigned those other sub-segments.

In a similar manner, the WCD 720 is shown as receiving a transmission of the resource block 706 and recovering its data 720-*d* from the sub-segment 706-2. Likewise, the WCD 722 is shown as receiving a transmission of the resource block 706 and recovering its data 722-*d* from the sub-segment 706-3; and the WCD 724 is shown as receiving a transmission of the resource block 706 and recovering its data 720-*d* from the sub-segment 706-4. Note again that sub-segments in the shared resource block 706 depicted in gray text indicate the presence of other sub-segments not assigned to the particular WCD that received the shared resource block.

Thus, in accordance with example embodiments, a single downlink resource block can be shared by two or more WCDs. And a hash function applied to a digital identifier of each WCD can be used to assign a different sub-segment of the share downlink resource block to each of the two or more WCDs.

Figure 8:
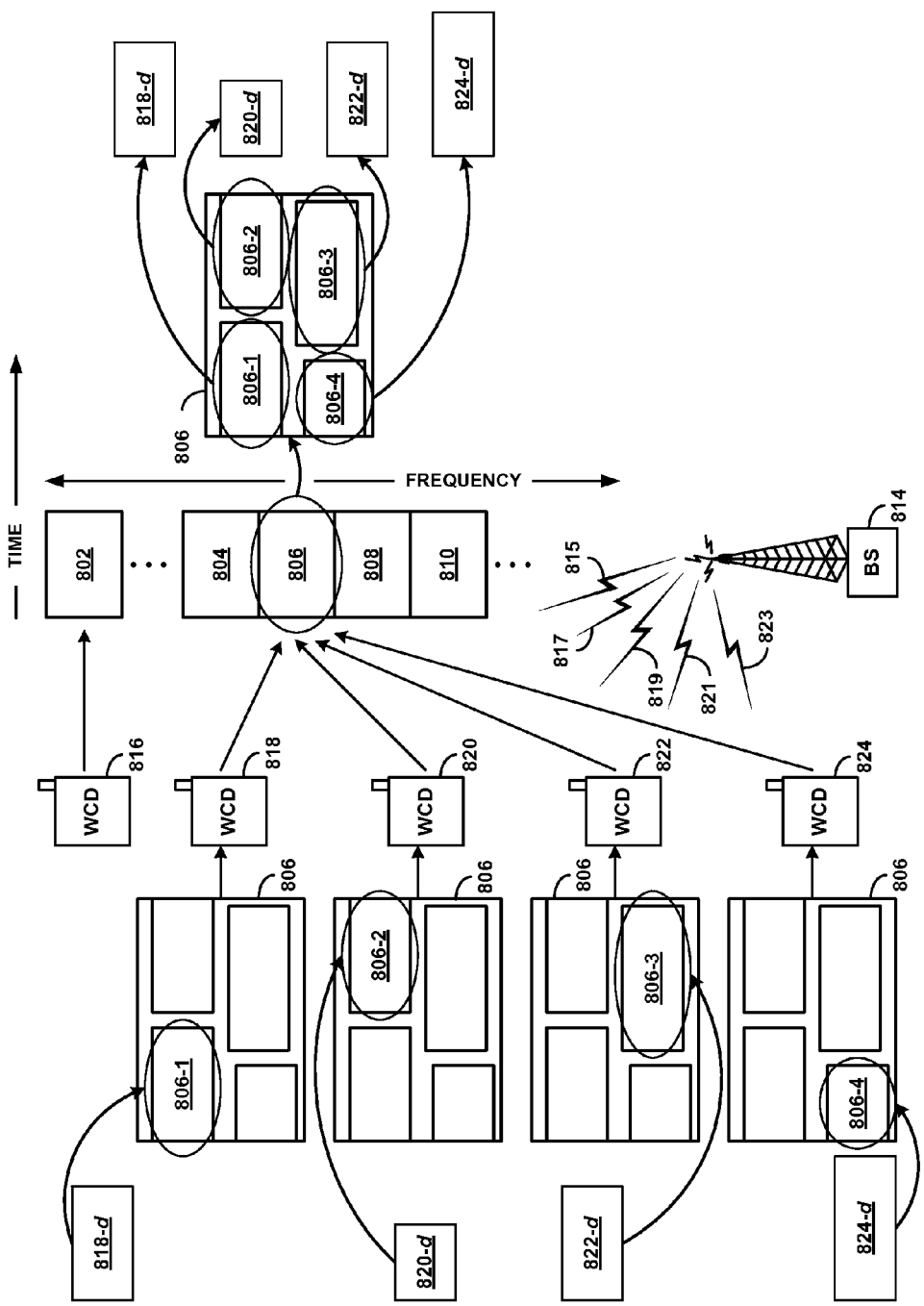
FIG. 8 is a conceptual illustration of shared allocation of an uplink resource block, in accordance with an example embodiment.

FIG. 8 is a conceptual illustration of shared allocation of an uplink resource block, in accordance with an example embodiment. As shown, a base station 814 communicates with WCDs 816, 818, 820, 822, and 824 by way of air interface links 815, 817, 819, 821, and 823, respectively. The illustration depicts a snapshot one slot during which representative uplink resource blocks 802, . . . , 804, 806, 808, 810, . . . are transmitted by the WCDs 816-824 and received by the base station 814. Frequency is shown on a vertical axis, spanning the resource blocks, and time is shown on a horizontal axis.

As illustrated by way of example, the uplink resource block 806 has been allocated to the WCDs 818-824 on a shared basis for transmission of respective data 818-*d*, 820-*d*, 822-*d*, and 824-*d*. Also by way of example, the shared resource block 806 is represented conceptually as including sub-segments 806-1, 806-2, 806-3, and 806-4. In the example illustration, the uplink resource block 802 has been allocated exclusively to the WCD 816. This arrangement is included to illustrate how some uplink resource blocks can be shared while others may not be. Although not necessarily shown explicitly in FIG. 8, the base station 814 can signal each WCD with information indicating the allocation of the uplink resource block 806. Then, in accordance with example embodiments, each of the WCDs 818-824 can determine that the uplink resource block 806 is designated for shared allocation.

Also in accordance with example embodiments, the base station 814 can apply a hash function to each of the WCDs 818-824 to determine which sub-segment to assign to each WCD. By way of example, the hash function applied to the WCD 818 evidently designates the sub-segment 806-1. Similarly, and also by way of example, the hash function applied to the WCD 820 evidently designates the sub-segment 806-2; the hash function applied to the WCD 822 evidently designates the sub-segment 806-3; and the hash function applied to the WCD 824 evidently designates the sub-segment 806-4.

In further accordance with example embodiments, each of the WCDs 718-724 will apply the same hash operation as the base station 814 did when assigning sub-segments to of the WCDs. Thus, each WCD will determine which sub-segment of the shared uplink resource block it was assigned. Each WCD will then transmit its data to the base station 814 using only it assigned sub-segment.

More particularly and accordance with example embodiments, the WCD 818 will transmit its data 818-*d* using only the sub-segment 806-1 in the uplink resource block 806. Similarly, the WCD 820 will transmit its data 820-*d* using only the sub-segment 806-2; the WCD 822 will transmit its data 822-*d* using only the sub-segment 806-3; and the WCD 824 will transmit its data 824-*d* using only the sub-segment 806-4. As described above, the operation of transmitting data in a particular sub-segment involves scheduling the modulation and transmission of the data to that it uses one or more resource elements within the particular sub-segment.

As indicated by the arrows from each of the WCDs 818-824 to the shared resource block 806 received by the base station 814, each WCD makes a respective transmission of the resource block 806 to the base station 814. The respective transmissions are synchronized so that the base station 814 simultaneously receives all four transmissions of the uplink resource block 806 (possibly as well as other transmission from other WCDs being served by the base station). As described above, the transmissions from the WCDs include all the sub-carriers in the carrier band used by the base station. The shared resource block 806 is singled out in FIG. 8 for purposes illustrating example operation, in accordance with example embodiments. Also note that in practice, strict (perfect) synchronization and simultaneity may not be exactly achieved, for example due to differing propagation paths and motion of WCDs. However, LTE systems, such as the example wireless communication system 100, typically include procedures and protocols that account for and/or correct divergences from perfect synchronization and simultaneity. Thus, synchronization and simultaneity may be assumed to be effectively achieved.

In accordance with example embodiments, the base station 814 will recover the data transmitted by each of the WCDs 818-824 from their respective assigned sub-segments in the received shared uplink resource block 806. Thus, in the example illustration, the data 818-*d* from the WCD 818 is recovered from the sub-segment 806-1. Similarly, the data 820-*d* from the WCD 820 is recovered from the sub-segment 806-2; the data 822-*d* from the WCD 822 is recovered from the sub-segment 806-3; and the data 824-*d* from the WCD 824 is recovered from the sub-segment 806-4. The base station 814 can then process and/forward the data to the network in the same or similar manner that it would for data recovered from non-shared uplink resource blocks.

Thus, in accordance with example embodiments, a single uplink resource block can be shared by two or more WCDs. And a hash function applied to a digital identifier of each WCD can be used to assign a different sub-segment of the share uplink resource block to each of the two or more WCDs.

3. EXAMPLE METHODS

Figure 9:
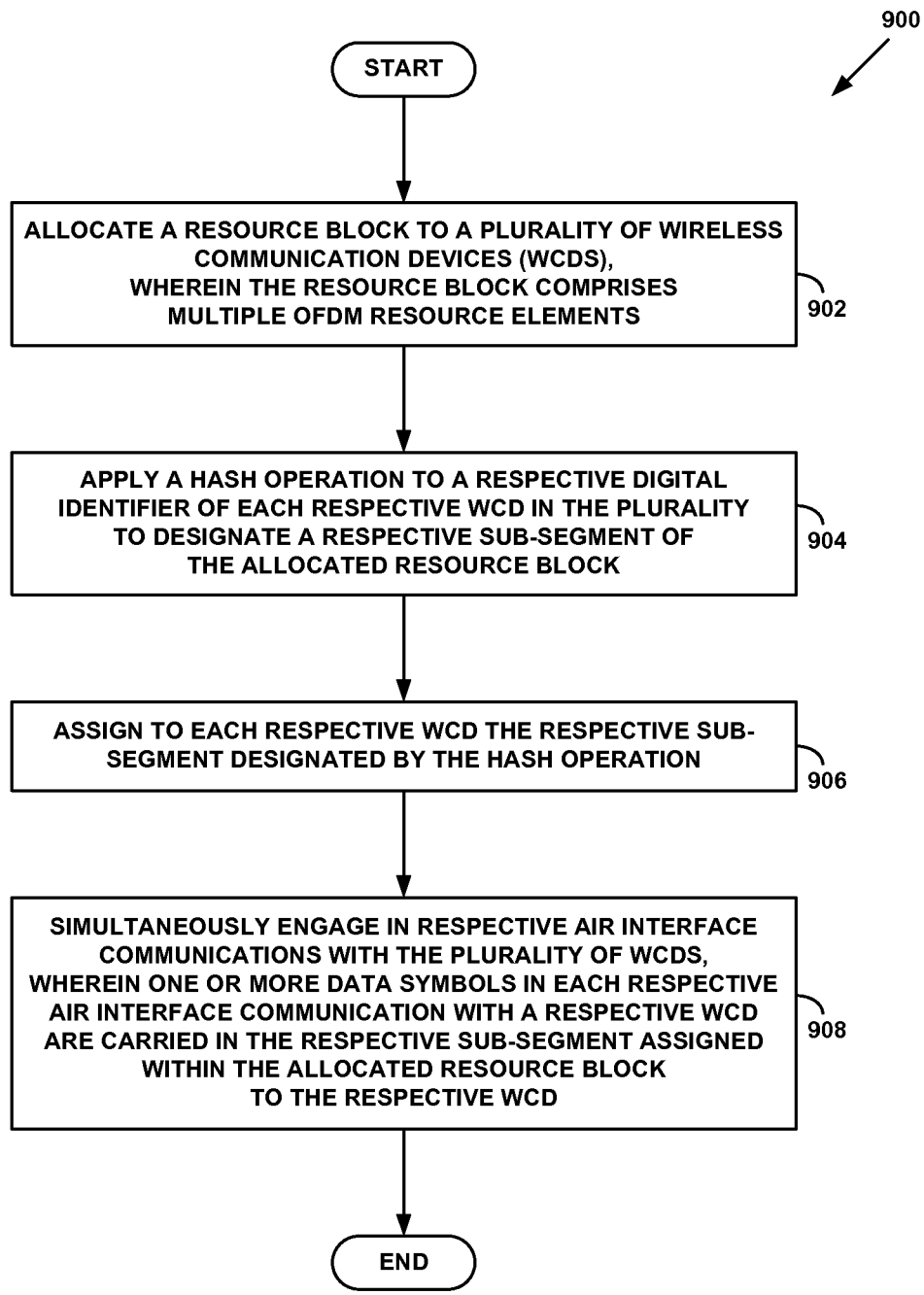
FIG. 9 is a flowchart of a method that may be performed by a base station, in accordance with an example embodiment.
Figure 10:
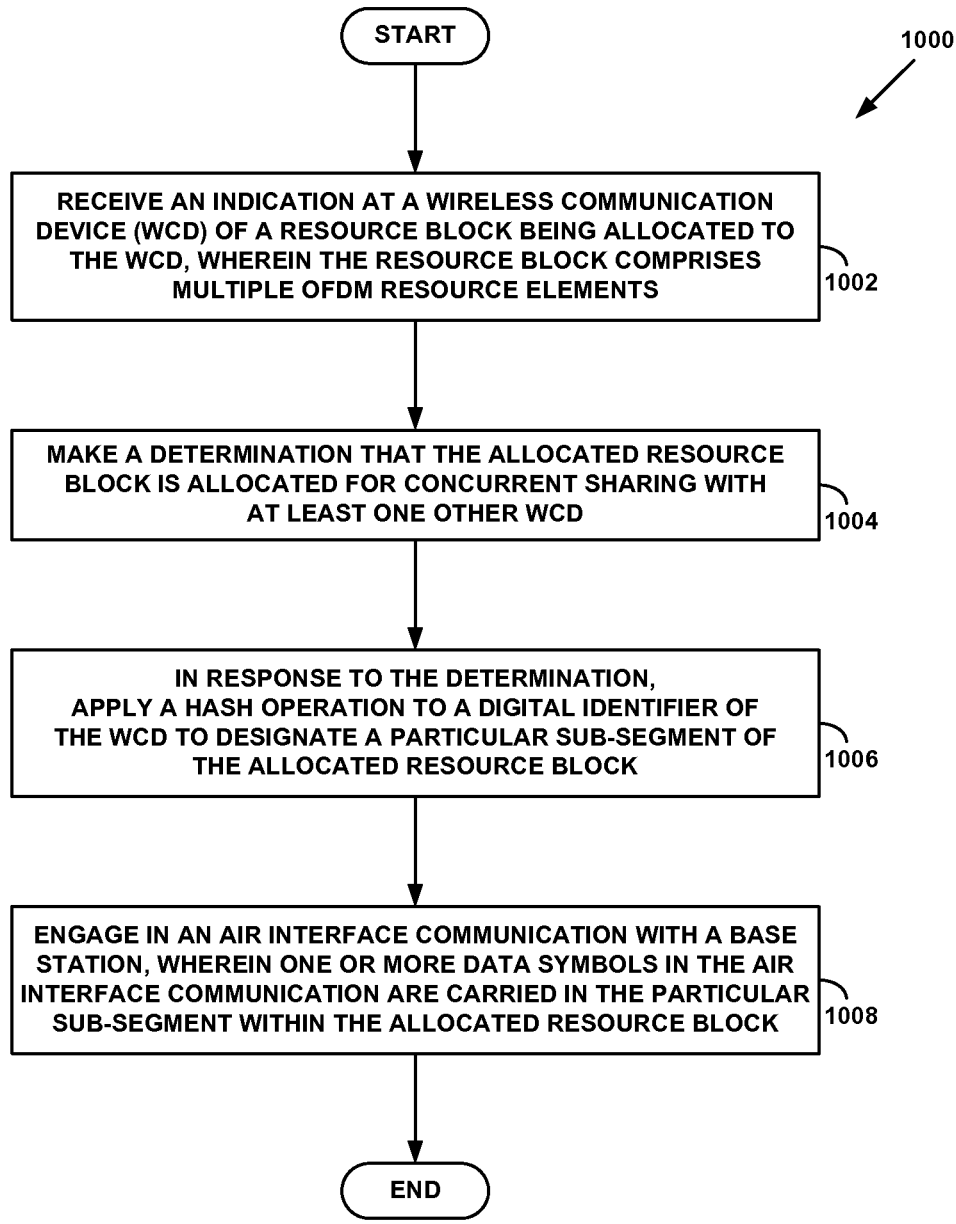
FIG. 10 is a flowchart of a method that may be performed by a WCD, in accordance with an example embodiment.

The example operation illustrated above involves aspects carried out by both a base station and a WCD. As such, an example technique for concurrent allocation to two or more WCDs of one or more resource blocks can be implemented as respective methods on a base station and on a WCD. FIG. 9 is flowchart illustrating an example of such method 900 that may be performed by a base station, such as the base station 300 in FIG. 3; and FIG. 10 is a flowchart illustrating an example of such a method 1000 that can be performed by a WCD, such as the WCD 400 in FIG. 4. By way of example, each of methods 900 and 1000 can be implemented as machine language instructions that can be stored on non-transient machine-readable media (e.g, solid state memory, magnetic disk, etc), and that when executed by one or more processors or a base station or WCD cause the base station or WCD to carry out operations, steps, and/or functions of the respective methods.

In the method 900, a base station serves multiple WCDs operating in the base station's wireless coverage area. More particularly, the base station can include a transceiver that defines the wireless coverage area. As one particular example, a base station, such as base station 114, might serve four WCD, such as the WCDs 116-122. In other examples, the base station might server a greater or fewer number of WCDs.

At step 902, a base station allocates a resource block to a plurality of WCDs. As described above, a resource block can be made up of multiple OFDM resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol.

At step 904, the base station applies a hash operation to a respective digital identifier of each respective WCD in the plurality of WCDs to designate for each respective WCD a respective sub-segment of the allocated resource block. In particular, each respective sub-segment can correspond to a different grouping of one or more OFDM resource elements within the allocated resource block. In accordance with example embodiments, the respective digital identifier of each respective WCD could be an International Mobile Subscriber Identity (IMSI) associated with the respective WCD, or an Electronic Serial Number (ESN) associated with the respective WCD.

At step 906, the base station assigns to each respective WCD in the plurality of WCDs the respective sub-segment designated by the hash operation applied to the respective digital identifier of the respective WCD.

Finally, at step 908, the base station engages, by way of transceiver, in simultaneous respective air interface communications with the plurality of WCDs. In the communication with each respective WCD in the plurality, one or more data symbols are carried in the respective sub-segment assigned within the allocated resource block to the respective WCD.

In accordance with example embodiments, the allocated resource block can be a downlink resource block. As such, simultaneously engaging in respective air interface communications with the plurality of WCDs can entail populating one or more data symbols for each respective WCD into a corresponding one or more resource elements of the respective sub-segment assigned within the allocated resource block to the respective WCD, and simultaneously transmitting the allocated resource block on a downlink to the plurality of WCDs. Transmission can be made using a transmitter of the transceiver, as described above.

Also in accordance, the allocated resource block can be an uplink resource block. As such, simultaneously engaging in respective air interface communications with the plurality of WCDs can entail simultaneously receiving a respective uplink transmission of the allocated resource block from each respective WCD in the plurality of WCDs, and, for each respective WCD, recovering from the received respective uplink transmission of the allocated resource block one or more data symbols from a corresponding one or more resource elements of the respective sub-segment assigned within the allocated resource block to the respective WCD. Reception can be made using a receiver of the transceiver, as described above.

In accordance with example embodiments, allocating the resource block to the plurality of WCDs can entail allocating the resource block to the plurality of WCDs from among one or more resource blocks that are designated for shared allocation among multiple WCDs. More particularly, the base station (or some other element in the network) can designate certain resource blocks for shared allocation, and prior to allocating a shareable resource block to the plurality of WCDs, each of the plurality of WCDs can be provided with information indicating one or more of these resource blocks that are designated for shared allocation among multiple WCDs. In further accordance with example embodiments, providing each of the plurality of WCDs with the information can entail preconfiguring one or more of the plurality of WCDs with the information, transmitting the information in a message to one or more of the plurality of WCDs, some combination of both. For example, the base station can periodically broadcast a message that updates a list of shareable resource blocks. In another example, WCDs can be preconfigured with this information. In still another example, WCDs can be preconfigured with a list of resource blocks that are allocated on a shared basis, and the base station can broadcast updates to the list from time to time.

Also in accordance with example embodiments, the plurality of WCDs may include only WCDs for which applying the hash operation results in designations of different, mutually exclusive (non-overlapping) sub-segments of the resource block. As describe above, for example, the base station (or some other network entity) could apply the hash operation to a possibly larger set of WCDs to ensure that no two WCDs hash to the same sub-segment of any given shareable resource block. Then, only those WCDs that meet this exclusivity condition will be included in the plurality. In this way, it can be assured that allocation of the shared resource block (at step 902) will be made only to WCDs that will each, by virtue of the hash function, be assigned a different, non-overlapping, sub-segment. Any WCD that is excluded from the plurality by the prior application of the hash function can be considered for shared allocation of a resource block at some other time.

In further accordance with example embodiments, the method 900 can also involve the base station receiving a data stream including respective data for each of the WCDs in the plurality of WCDs, and determining that at least a portion of the respective data for each of the WCDs of the plurality can be accommodated within a respective sub-segment of a given one of a plurality of resource blocks that are designated for shared allocation among multiple WCDs. More particularly, the base station can determine that data intended for transmission to the WCDs in the plurality can be accommodated, at least in part, in one or more share resource blocks.

In still further accordance with example embodiments, the method 900 can also involve the base station determining a respective amount of data to be transmitted by each of the WCDs in the plurality of WCDs, and then determining that at least a portion of the respective amount of data to be transmitted by each of the WCDs in the plurality of WCDs can be accommodated within a respective sub-segment of a given one of a plurality of resource blocks that are designated for shared allocation among multiple WCDs. More specifically, each of the WCDs in the plurality may send a request to the base station for uplink resources in order to transmit data to the network. The base station may then determine from the requests how much data each of the WCDs has to transmit, possibly as well as the types of data and/or data rates required by the WCDs. From this information, the base station may then determine that the requested uplink transmissions can be accommodated by one or more shared uplink resource blocks.

In the method 1000, a WCD, such as WCD 116, can be operating in a wireless coverage area of a base station, such as base station 114. The base station can concurrently allocate a resource block (or selected resource elements of a resource block) to both the WCD and one or more additional WCDs (e.g., WCD 118-122).

At step 1002, a WCD receives an indication of a resource block being allocated to the WCD. As described above, a resource block can be made up of multiple OFDM resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol.

At step 1004, the WCD makes a determination that the allocated resource block is allocated for concurrent sharing with at least one other WCD.

At step 1006, the WCD the WCD responds to the determination by applying a hash operation to a digital identifier of the WCD to designate a particular sub-segment of the allocated resource block. In particular, the particular sub-segment can correspond to a particular grouping of one or more OFDM resource elements within the allocated resource block. In accordance with example embodiments, the digital identifier of the WCD could be an International Mobile Subscriber Identity (IMSI) associated with the respective WCD, or an Electronic Serial Number (ESN) associated with the WCD.

Finally, at step 1010, the WCD engages, by way of a transceiver, in an air interface communication with a base station. In the air interface communication, one or more data symbols are carried in the particular sub-segment within the allocated resource block.

In accordance with example embodiments, the allocated resource block can be an uplink resource block. As such, engaging in respective air interface communications with the base station can entail the WCD populating one or more data symbols into a corresponding one or more resource elements of the particular sub-segment within the allocated resource block, and, transmitting the allocated resource block on an uplink air interface to the base station. Transmission can be made using a transmitter of the transceiver, as described above.

Also in accordance with example embodiments, the allocated resource block can be a downlink resource block. As such, engaging in the air interface communication with the base station comprises can entail the WCD receiving a downlink transmission of the allocated resource block from the base station, and then recovering from the received downlink transmission of the allocated resource block one or more data symbols from a corresponding one or more resource elements of the particular sub-segment within the allocated resource block. Reception can be made using a receiver of the transceiver, as described above.

In accordance with example embodiments, the WCD making the determination that the allocated resource block is allocated for concurrent sharing with at least one other WCD can entail the WCD receiving a message from the base station indicating that the allocated resource block is one of one or more resource blocks that are designated for shared allocation among multiple WCDs.

Alternatively or additionally, the WCD could be preconfigured with information indicating one or more shareable resource blocks that are designated for shared allocation among multiple WCDs. In this case, the WCD making the determination that the allocated resource block is allocated for concurrent sharing with at least one other WCD can entail the WCD determining that the allocated resource block is one of the one or more shareable resource blocks.

It will be appreciated that the example methods 900 and 1000 could each include alternate and/or additional steps, while still remaining within the scope and spirit of example embodiments herein.

4. CONCLUSION

Exemplary embodiments have been described above. Those skilled in the art will understand, however, that changes and modifications may be made to these embodiments without departing from the true scope and spirit of the invention.

What is claimed is:

1. A method comprising:
   allocating a resource block to a plurality of wireless communication devices (WCDs), wherein the resource block comprises multiple orthogonal frequency division multiplexing (OFDM) resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol;
   applying a hash operation to a respective digital identifier of each respective WCD in the plurality of WCDs to designate for each respective WCD a respective sub-segment of the allocated resource block, wherein each respective sub-segment comprises a different grouping of one or more OFDM resource elements within the allocated resource block;
   assigning to each respective WCD in the plurality of WCDs the respective sub-segment designated by the hash operation applied to the respective digital identifier of the respective WCD; and
   simultaneously engaging, by a transceiver, in respective air interface communications with the plurality of WCDs, wherein one or more data symbols in each respective air interface communication with a respective WCD in the plurality are carried in the respective sub-segment assigned within the allocated resource block to the respective WCD.

2. The method of claim 1, wherein the allocated resource block is a downlink resource block,
   and wherein simultaneously engaging, by the transceiver, in respective air interface communications with the plurality of WCDs comprises:
   for each respective WCD in the plurality of WCDs, populating one or more data symbols for the respective WCD into a corresponding one or more resource elements of the respective sub-segment assigned within the allocated resource block to the respective WCD; and
   simultaneously transmitting, by a transmitter of the transceiver, the allocated resource block on a downlink to the plurality of WCDs.

3. The method of claim 1, wherein the allocated resource block is an uplink resource block,
   and wherein simultaneously engaging, by the transceiver, in respective air interface communications with the plurality of WCDs comprises:
   simultaneously receiving, by a receiver of the transceiver, a respective uplink transmission of the allocated resource block from each respective WCD in the plurality of WCDs; and
   for each respective WCD in the plurality of WCDs, recovering from the received respective uplink transmission of the allocated resource block one or more data symbols from a corresponding one or more resource elements of the respective sub-segment assigned within the allocated resource block to the respective WCD.

4. The method of claim 1, wherein allocating the resource block to the plurality of WCDs comprises:
   allocating the resource block to the plurality of WCDs from among a one or more resource blocks that are designated for shared allocation among multiple WCDs.

5. The method of claim 4, further comprising:
   prior to allocating the resource block to the plurality of WCDs, providing each of the plurality of WCDs with information indicating the one or more resource blocks that are designated for shared allocation among multiple WCDs,
   wherein providing each of the plurality of WCDs with the information is at least one of (i) preconfiguring one or more of the plurality of WCDs with the information, or (ii) transmitting the information in a message to one or more of the plurality of WCDs.

6. The method of claim 1, wherein the plurality of WCDs includes only WCDs for which applying the hash operation results in designations of different, mutually exclusive sub-segments of the resource block.

7. The method of claim 1, further comprising:
   receiving a data stream including respective data for each of the WCDs in the plurality of WCDs; and
   determining that at least a portion of the respective data for each of the WCDs of the plurality can be accommodated within a respective sub-segment of a given one of a plurality of resource blocks that are designated for shared allocation among multiple WCDs.

8. The method of claim 1, further comprising:
   determining a respective amount of data to be transmitted by each of the WCDs in the plurality of WCDs; and
   determining that at least a portion of the respective amount of data to be transmitted by each of the WCDs in the plurality of WCDs can be accommodated within a respective sub-segment of a given one of a plurality of resource blocks that are designated for shared allocation among multiple WCDs.

9. The method of claim 1, wherein the respective digital identifier of each respective WCD in the plurality of WCDs is one of an International Mobile Subscriber Identity (IMSI) associated with the respective WCD, or an Electronic Serial Number (ESN) associated with the respective WCD.

10. A method comprising:
- a wireless communication device (WCD) receiving an indication of a resource block being allocated to the WCD, wherein the resource block comprises multiple orthogonal frequency division multiplexing (OFDM) resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol;
- the WCD making a determination that the allocated resource block is allocated for concurrent sharing with at least one other WCD;
- in response to making the determination, the WCD applying a hash operation to a digital identifier of the WCD to designate a particular sub-segment of the allocated resource block, wherein the particular sub-segment comprises a particular grouping of one or more OFDM resource elements within the allocated resource block; and
- the WCD engaging, by a transceiver of the WCD, in an air interface communication with a base station, wherein one or more data symbols in the air interface communication are carried in the particular sub-segment within the allocated resource block.

11. The method of claim 10, wherein the allocated resource block is an uplink resource block,
- and wherein engaging, by the transceiver of the WCD, in the air interface communication with the base station comprises:
- the WCD populating one or more data symbols into a corresponding one or more resource elements of the particular sub-segment within the allocated resource block; and
- transmitting, by a transmitter of the transceiver, the allocated resource block on an uplink air interface to the base station.

12. The method of claim 10, wherein the allocated resource block is a downlink resource block,
- and wherein engaging, by the transceiver of the WCD, in the air interface communication with the base station comprises:
- the WCD receiving, by a receiver of the transceiver, a downlink transmission of the allocated resource block from the base station; and
- the WCD recovering from the received downlink transmission of the allocated resource block one or more data symbols from a corresponding one or more resource elements of the particular sub-segment within the allocated resource block.

13. The method of claim 10, wherein the WCD making the determination that the allocated resource block is allocated for concurrent sharing with at least one other WCD comprises:
- the WCD receiving a message from the base station indicating that the allocated resource block is one of one or more resource blocks that are designated for shared allocation among multiple WCDs.

14. The method of claim 10, wherein the WCD is preconfigured with information indicating one or more shareable resource blocks that are designated for shared allocation among multiple WCDs,
- and wherein the WCD making the determination that the allocated resource block is allocated for concurrent sharing with at least one other WCD comprises:
- the WCD determining that the allocated resource block is one of the one or more shareable resource blocks.

15. The method of claim 10, wherein the digital identifier of the WCD is one of an International Mobile Subscriber Identity (IMSI) associated with the WCD, or an Electronic Serial Number (ESN) associated with the WCD.

16. A base station comprising:
- a transceiver for engaging wireless communications with wireless communication devices (WCDs) operating in a wireless coverage area of the base station;
- one or more processors;
- memory accessible to the one or more processors; and
- machine-readable instructions stored in the memory, that upon execution by the one or more processors cause the base station to carry out operations including:
- allocating a resource block to a plurality of WCDs, wherein the resource block comprises multiple orthogonal frequency division multiplexing (OFDM) resource elements arrayed in frequency and time for a respective simultaneous transmission across a contiguous sequence of orthogonal sub-carriers at each respective one of a contiguous sequence of symbol transmission times, and wherein each resource element is configured for carrying a respective data symbol,
- applying a hash operation to a respective digital identifier of each respective WCD in the plurality of WCDs to designate for each respective WCD a respective sub-segment of the allocated resource block, wherein each respective sub-segment comprises a different grouping of one or more OFDM resource elements within the allocated resource block,
- assigning to each respective WCD in the plurality of WCDs the respective sub-segment designated by the hash operation applied to the respective digital identifier of the respective WCD, and
- simultaneously engaging, by the transceiver, in respective air interface communications with the plurality of WCDs, wherein one or more data symbols in each respective air interface communication with a respective WCD in the plurality are carried in the respective sub-segment assigned within the allocated resource block to the respective WCD.

17. The base station of claim 16, wherein the allocated resource block is a downlink resource block,
- and wherein simultaneously engaging, by the transceiver, in respective air interface communications with the plurality of WCDs comprises:
- for each respective WCD in the plurality of WCDs, populating one or more data symbols for the respective WCD into a corresponding one or more resource elements of the respective sub-segment assigned within the allocated resource block to the respective WCD; and
- simultaneously transmitting, by a transmitter of the transceiver, the allocated resource block on a downlink to the plurality of WCDs.

18. The base station of claim 16, wherein the allocated resource block is an uplink resource block,
- and wherein simultaneously engaging, by the transceiver, in respective air interface communications with the plurality of WCDs comprises:
- simultaneously receiving, by a receiver of the transceiver, a respective uplink transmission of the allocated resource block from each respective WCD in the plurality of WCDs; and
- for each respective WCD in the plurality of WCDs, recovering from the received respective uplink transmission of the allocated resource block one or more data symbols from a corresponding one or more resource elements of the respective sub-segment assigned within the allocated resource block to the respective WCD.

19. The base station of claim 16, wherein the operations further include:
   receiving a data stream including respective data for each of the WCDs in the plurality of WCDs; and
   determining that at least a portion of the respective data for each of the WCDs of the plurality can be accommodated within a respective sub-segment of a given one of a plurality of resource blocks that are designated for shared allocation among multiple WCDs.

20. The base station of claim 16, wherein the operations further include:
   determining a respective amount of data to be transmitted by each of the WCDs in the plurality of WCDs; and
   determining that at least a portion of the respective amount of data to be transmitted by each of the WCDs in the plurality of WCDs can be accommodated within a respective sub-segment of a given one of a plurality of resource blocks that are designated for shared allocation among multiple WCDs.

* * * * *